(12) United States Patent
Zhou et al.

(10) Patent No.: US 9,807,593 B2
(45) Date of Patent: Oct. 31, 2017

(54) COMMUNICATIONS SYSTEM, CAPABILITY OPENNESS GATEWAY, AND METHOD FOR OPENING WIRELESS PIPE CAPABILITY

(71) Applicant: Huawei Technologies Co., Ltd., Shenzhen, Guangdong (CN)

(72) Inventors: Wentao Zhou, Shenzhen (CN); Wenbo Diao, Shenzhen (CN); Qingshun Liu, Shenzhen (CN); Wenyong Han, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 232 days.

(21) Appl. No.: 14/755,925

(22) Filed: Jun. 30, 2015

(65) Prior Publication Data
US 2015/0327053 A1 Nov. 12, 2015

Related U.S. Application Data

(63) Continuation of application No. PCT/CN2012/087980, filed on Dec. 31, 2012.

(51) Int. Cl.
*H04W 4/00* (2009.01)
*H04W 8/18* (2009.01)
(Continued)

(52) U.S. Cl.
CPC ............. *H04W 8/18* (2013.01); *H04W 24/02* (2013.01); *H04W 12/06* (2013.01)

(58) Field of Classification Search
None
See application file for complete search history.

(56) References Cited

U.S. PATENT DOCUMENTS

2006/0218291 A1* 9/2006 Zhu ............... H04L 65/1069
709/229
2009/0104891 A1* 4/2009 Shu ............... H04L 12/2898
455/411
(Continued)

FOREIGN PATENT DOCUMENTS

CN 101291449 A 10/2008
CN 102035762 A 4/2011
(Continued)

OTHER PUBLICATIONS

"3rd Generation Partnership Project; Technical Specification Group Services and System Aspects; Policy and charging control architecture (Release 11)", 3GPP TS 23.203 V11.8.0, Dec. 2012, 179 pages.
(Continued)

Primary Examiner — Phirin Sam

(57) ABSTRACT

Embodiments of the present invention provide a communications system, a capability openness gateway, and a method for opening a wireless pipe capability. The system includes: a COGW and at least one wireless pipe network element, where a first interface is provided between the COGW and the capability openness object, and a second interface is provided between the COGW and the at least one wireless pipe network element; the COGW is configured to converge a capability of the at least one wireless pipe network element through the second interface, and supply the capability of the at least one wireless pipe network element to the capability openness object through the first interface; and the capability openness object is configured to use the capability of the at least one wireless pipe network element, thereby implementing openness of a wireless pipe capability.

20 Claims, 16 Drawing Sheets

(51) Int. Cl.
*H04W 24/02* (2009.01)
*H04W 12/06* (2009.01)

(56) References Cited

U.S. PATENT DOCUMENTS

| | | | | |
|---|---|---|---|---|
| 2010/0007483 | A1* | 1/2010 | Oh | H04L 67/36 340/521 |
| 2011/0019650 | A1* | 1/2011 | van Niekerk | H04L 65/1069 370/338 |
| 2011/0107379 | A1* | 5/2011 | Lajoie | H04L 65/1016 725/87 |
| 2012/0026973 | A1* | 2/2012 | Bontu | H04W 36/02 370/331 |
| 2013/0188515 | A1* | 7/2013 | Pinheiro | H04W 4/001 370/254 |
| 2013/0294443 | A1* | 11/2013 | Kahn | H04L 65/1073 370/352 |
| 2016/0241719 | A1* | 8/2016 | Kahn | H04L 65/1073 |

FOREIGN PATENT DOCUMENTS

| | | |
|---|---|---|
| CN | 102340767 A | 2/2012 |
| EP | 2 582 175 A1 | 4/2013 |
| WO | WO 2011/143939 A1 | 11/2011 |

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 11)", 3GPP TS 23.401 V11.4.0, Dec. 2012, 284 pages.

"3rd Generation Partnership Project; Technical Specification Group Services and System Aspects; General Packet Radio Service (GPRS); Service description; Stage 2 (Release 11)", 3GPP TS 23.060 V11.4.0, Dec. 2012, 335 pages.

"3rd Generation Partnership Project; Technical Specification Group Core Network and Terminals; Open Service Access (OSA); Stage 2 (Release 9)", 3GPP TS 23.198 V9.0.0, Dec. 2009, 33 pages.

* cited by examiner

COMMUNICATIONS SYSTEM, CAPABILITY OPENNESS GATEWAY, AND METHOD FOR OPENING WIRELESS PIPE CAPABILITY

CROSS-REFERENCE TO RELATED APPLICATIONS

This application is a continuation of International Application No. PCT/CN2012/087980, filed on Dec. 31, 2012, which is hereby incorporated by reference in its entirety.

TECHNICAL FIELD

The present invention relates to the field of communications, and in particular, to a communications system, a capability openness gateway, and a method for opening a wireless pipe capability.

BACKGROUND

Currently, openness of service capabilities, cloud computing capabilities, and information technology (Information Technology, IT) capabilities is in a development stage of growing in scale and becoming standardized. For example, service capabilities opened on a service platform include conventional mobile services, mobile value-added services, and the like. Capabilities opened on a cloud computing platform include cloud computing and storage services, and the like, for small and medium enterprises (Small and Middle Enterprise, SME). As can be seen, openness of various service platform capabilities provides diversified services and user services. A wireless pipe is considered as a core asset of a wireless operator, and if a capability of the wireless pipe is opened to an upper-layer application, diversified services may also be provided. However, current openness of wireless pipe capabilities is still in a stage of technological innovation and exploration.

SUMMARY

Embodiments of the present invention provide a communications system, a capability openness gateway, and a method for opening a wireless pipe capability, which can implement openness of a wireless pipe capability.

A first aspect provides a communications system, including: a capability openness object, a capability openness gateway COGW, and at least one wireless pipe network element, where a first interface is provided between the COGW and the capability openness object, and a second interface is provided between the COGW and the at least one wireless pipe network element; the COGW is configured to converge a capability of the at least one wireless pipe network element through the second interface, and supply the capability of the at least one wireless pipe network element to the capability openness object through the first interface; and the capability openness object is configured to use the capability of the at least one wireless pipe network element.

With reference to the first aspect, in a first possible implementation manner, each of the at least one wireless pipe network element includes a COGW agent module, and the second interface is provided between the COGW and the COGW agent module.

With reference to the first aspect or the first possible implementation manner of the first aspect, in a second possible implementation manner, the capability of the at least one wireless pipe network element includes at least one of the following: a service flow level capability, a user level capability, a cell level capability, a base station level capability, and a system level capability.

With reference to the first aspect or the first possible implementation manner of the first aspect, in a third possible implementation manner, the capability of the at least one wireless pipe network element includes a capability of providing atomic wireless pipe information; the COGW is specifically configured to obtain the atomic wireless pipe information from the at least one wireless pipe network element through the second interface, and process the atomic wireless pipe information to obtain wireless pipe information, where the wireless pipe information indicates a wireless pipe state; and the capability openness object is configured to obtain the wireless pipe information from the COGW through the first interface.

With reference to the third possible implementation manner of the first aspect, in a fourth possible implementation manner, the COGW is specifically configured to perform anonymization processing on user information in the atomic wireless pipe information to obtain the wireless pipe information.

With reference to the third possible implementation manner of the first aspect or the fourth possible implementation manner of the first aspect, in a fifth possible implementation manner, the capability openness object is further configured to: before obtaining the wireless pipe information from the COGW through the first interface, send a first capability query message to the COGW through the first interface, where the first capability query message is used for requesting the wireless pipe information; the COGW is specifically configured to send a second capability query message to the at least one wireless pipe network element through the second interface according to the first capability query message, where the second capability query message is used for requesting the atomic wireless pipe information; and the at least one wireless pipe network element is configured to send the atomic wireless pipe information to the COGW through the second interface according to the second capability query message.

With reference to the third possible implementation manner of the first aspect or the fourth possible implementation manner of the first aspect, in a sixth possible implementation manner, the capability openness object is further configured to: before obtaining the wireless pipe information from the COGW through the first interface, send a first capability subscription message to the COGW through the first interface, where the first capability subscription message is used for instructing the COGW to report the wireless pipe information within a subscription time; the COGW is further configured to send a second capability subscription message to the at least one wireless pipe network element through the second interface according to the first capability subscription message, where the second capability subscription message is used for instructing the at least one wireless pipe network element to report the atomic wireless pipe information within the subscription time; and the at least one wireless pipe network element is configured to send the atomic wireless pipe information to the COGW through the second interface within the subscription time.

With reference to the sixth possible implementation manner of the first aspect, in a seventh possible implementation manner, the capability openness object is further configured to send a first capability unsubscription message to the COGW through the first interface, where the first capability unsubscription message is used for instructing the COGW to stop reporting the wireless pipe information; and the COGW is further configured to send a second capability unsubscription message to the at least one wireless pipe network element through the second interface according to the first capability unsubscription message, where the second capability unsubscription message is used for instructing the at least one wireless pipe network element to stop reporting the atomic wireless pipe information.

With reference to the first aspect or the first possible implementation manner of the first aspect, in an eighth possible implementation manner, the capability of the at least one wireless pipe network element includes a capability of configuring a wireless network; the capability openness object is specifically configured to send a first control message to the COGW through the first interface, where the first control message is used for instructing to the COGW configure the wireless network; and the COGW is specifically configured to control, through the second interface according to the first control message, the at least one wireless pipe network element to configure the wireless network.

With reference to the eighth possible implementation manner of the first aspect, in a ninth possible implementation manner, the COGW is specifically configured to send a second control message to the at least one wireless pipe network element through the second interface according to the first control message, where the second control message is used for instructing to configure the wireless network; and the at least one wireless pipe network element is configured to configure the wireless network according to the second control message.

With reference to the first aspect or any possible implementation manner of the first possible implementation manner of the first aspect to the ninth possible implementation manner of the first aspect, in a tenth possible implementation manner, the capability openness object is further configured to: before using the capability of the at least one wireless pipe network element, send an authentication and authorization request message to the COGW through the first interface, where the authentication and authorization request message is used for requesting authentication on an identity of the capability openness object; and the COGW is further configured to send an authentication and authorization response message to the capability openness object through the first interface, where the authentication and authorization response message is used for indicating that the authentication on the identity of the capability openness object succeeds.

With reference to the first aspect or any possible implementation manner of the first possible implementation manner of the first aspect to the tenth possible implementation manner of the first aspect, in an eleventh possible implementation manner, the capability openness object is further configured to send an openable capability query message to the COGW through the first interface, where the openable capability query message is used for requesting an openable capability list, and the openable capability list includes a capability of a wireless pipe network element that can be supplied to the capability openness object; and the COGW is further configured to send an openable capability response message to the capability openness object through the first interface, where the openable capability response message includes the openable capability list.

With reference to the first aspect or any possible implementation manner of the first possible implementation manner of the first aspect to the eleventh possible implementation manner of the first aspect, in a twelfth possible implementation manner, the capability openness object is further configured to send a capability adding request message to the COGW through the first interface, where the capability adding request message is used for requesting the COGW to add the capability of the at least one wireless pipe network element into the openable capability list, and the openable capability list includes the capability of the wireless pipe network element that can be supplied to the capability openness object; and the COGW is further configured to send a capability adding response message to the capability openness object through the first interface, where the capability adding response message is used for indicating that the capability of the at least one wireless pipe network element is successfully added into the openable capability list.

With reference to the first aspect or any possible implementation manner of the first possible implementation manner of the first aspect to the twelfth possible implementation manner of the first aspect, in a thirteenth possible implementation manner, the COGW includes a first group of sub-COGWs and a second group of sub-COGWs; the first interface is provided between the first group of sub-COGWs and the capability openness object, the first group of sub-COGWs is connected to the second group of sub-COGWs, the first group of sub-COGWs include 1 sub-COGW, and the second group of sub-COGWs include n sub-COGWs; and the n sub-COGWs are in a one-to-one correspondence with n groups of wireless pipe network elements, the second interface is provided between each sub-COGWs and its corresponding group of wireless pipe network elements, and the n groups of wireless pipe network elements are obtained by grouping the at least one wireless pipe network element, where n is a positive integer.

With reference to the thirteenth possible implementation manner of the first aspect, in a fourteenth possible implementation manner, the n groups of wireless pipe network elements are obtained by grouping, according to a region in which the at least one wireless pipe network element is located, the at least one wireless pipe network element; or, the n groups of wireless pipe network elements are obtained by grouping, according to a manufacturer of the at least one wireless pipe network element, the at least one wireless pipe network element; or, the n groups of wireless pipe network elements are obtained by grouping, according to an operator to which the at least one wireless pipe network element belongs, the at least one wireless pipe network element.

With reference to the thirteenth possible implementation manner of the first aspect or the fourteenth possible implementation manner of the first aspect, in a fifteenth possible implementation manner, the second group of sub-COGWs and the at least one wireless pipe network element are located at a same geographical location, or the second group of sub-COGWs are located inside the at least one wireless pipe network element.

With reference to the first aspect or any possible implementation manner of the first possible implementation manner of the first aspect to the fifteenth possible implementation manner of the first aspect, in a sixteenth possible implementation manner, the capability openness object includes at least one of the following: an application function AF device and a user equipment.

A second aspect provides a capability openness gateway, including: a capability supply unit and a capability convergence unit, where a first interface is provided between the capability supply unit and a capability openness object, and a second interface is provided between the capability convergence unit and at least one wireless pipe network element; the capability convergence unit is configured to converge a capability of the at least one wireless pipe network element through the second interface; and the capability supply unit is configured to supply the capability of the at least one wireless pipe network element converged by the capability convergence unit to the capability openness object through the first interface, so that the capability openness object uses the capability of the at least one wireless pipe network element.

With reference to the second aspect, in a first possible implementation manner, the capability of the at least one wireless pipe network element includes at least one of the following: a service flow level capability, a user level capability, a cell level capability, a base station level capability, and a system level capability.

With reference to the second aspect, in a second possible implementation manner, the capability of the at least one wireless pipe network element includes a capability of providing atomic wireless pipe information; the capability convergence unit is specifically configured to obtain the atomic wireless pipe information from the at least one wireless pipe network element through the second interface; and the capability supply unit is specifically configured to process the atomic wireless pipe information obtained by the capability convergence unit to obtain wireless pipe information, and send the wireless pipe information to the capability openness object through the first interface, where the wireless pipe information indicates a wireless pipe state.

With reference to the second possible implementation manner of the second aspect, in a third possible implementation manner, the capability supply unit is specifically configured to perform anonymization processing on user information in the atomic wireless pipe information to obtain the wireless pipe information.

With reference to the second possible implementation manner of the second aspect or the third possible implementation manner of the second aspect, in a fourth possible implementation manner, the capability supply unit is further configured to: before sending the wireless pipe information to the capability openness object through the first interface, receive a first capability query message from the capability openness object through the first interface, where the first capability query message is used for requesting the wireless pipe information; the capability convergence unit is further configured to send a second capability query message to the at least one wireless pipe network element through the second interface according to the first capability query message received by the capability supply unit, where the second capability query message is used for requesting the atomic wireless pipe information; and the capability convergence unit is specifically configured to receive, through the second interface, the atomic wireless pipe information sent, according to the second capability query message, by the at least one wireless pipe network element.

With reference to the second possible implementation manner of the second aspect or the third possible implementation manner of the second aspect, in a fifth possible implementation manner, the capability supply unit is further configured to: before sending the wireless pipe information to the capability openness object through the first interface, receive a first capability subscription message from the capability openness object through the first interface, where the first capability subscription message is used for instructing to report the wireless pipe information within a subscription time; the capability convergence unit is further configured to send a second capability subscription message to the at least one wireless pipe network element through the second interface according to the first capability subscription message received by the capability supply unit, where the second capability subscription message is used for instructing the at least one wireless pipe network element to report the atomic wireless pipe information within the subscription time; and the capability convergence unit is specifically configured to receive, through the second interface, the atomic wireless pipe information that is sent by the at least one wireless pipe network element within the subscription time.

With reference to the fifth possible implementation manner of the second aspect, in a sixth possible implementation manner, the capability supply unit is further configured to receive a first capability unsubscription message from the capability openness object through the first interface, where the first capability unsubscription message is used for instructing to stop reporting the wireless pipe information; and the capability convergence unit is further configured to send a second capability unsubscription message to the at least one wireless pipe network element through the second interface according to the first capability unsubscription message received by the capability supply unit, where the second capability unsubscription message is used for instructing the at least one wireless pipe network element to stop reporting the atomic wireless pipe information.

With reference to the second aspect, in a seventh possible implementation manner, the capability of the at least one wireless pipe network element includes a capability of configuring a wireless network; the capability supply unit is specifically configured to receive a first control message from the capability openness object through the first interface, where the first control message is used for instructing the COGW to configure the wireless network; and the capability convergence unit is specifically configured to control, through the second interface according to the first control message received by the capability supply unit, the at least one wireless pipe network element to configure the wireless network.

With reference to the seventh possible implementation manner of the second aspect, in an eighth possible implementation manner, the capability convergence unit is specifically configured to send a second control message to the at least one wireless pipe network element through the second interface according to the first control message, where the second control message is used for instructing to configure the wireless network.

With reference to the second aspect or any possible implementation manner of the first possible implementation manner of the second aspect to the eighth possible implementation manner of the second aspect, in a ninth possible implementation manner, the capability supply unit is further configured to: before supplying the capability of the at least one wireless pipe network element to the capability openness object through the first interface, receive an authentication and authorization request message from the capability openness object through the first interface, where the authentication and authorization request message is used for requesting authentication on an identity of the capability openness object; and the capability supply unit is further configured to send an authentication and authorization response message to the capability openness object through the first interface, where the authentication and authorization response message is used for indicating that the authentication on the identity of the capability openness object succeeds.

With reference to the second aspect or any possible implementation manner of the first possible implementation manner of the second aspect to the ninth possible implementation manner of the second aspect, in a tenth possible implementation manner, the capability supply unit is further configured to receive an openable capability query message from the capability openness object through the first interface, where the openable capability query message is used for requesting an openable capability list, and the openable capability list includes a capability of a wireless pipe network element that can be supplied to the capability openness object; and the capability supply unit is further configured to send an openable capability response message to the capability openness object through the first interface, where the openable capability response message includes the openable capability list.

With reference to the second aspect or any possible implementation manner of the first possible implementation manner of the second aspect to the tenth possible implementation manner of the second aspect, in an eleventh possible implementation manner, the capability supply unit is further configured to receive a capability adding request message from the capability openness object through the first interface, where the capability adding request message is used for requesting the COGW to add the capability of the at least one wireless pipe network element into the openable capability list, and the openable capability list includes the capability of the wireless pipe network element that can be supplied to the capability openness object; and the capability supply unit is further configured to send a capability adding response message to the capability openness object through the first interface, where the capability adding response message is used for indicating that the capability of the at least one wireless pipe network element is successfully added into the openable capability list.

A third aspect provides a method for opening a wireless pipe capability, including: converging, by a capability openness gateway COGW, a capability of at least one wireless pipe network element through a second interface, where the second interface is an interface between the COGW and the at least one wireless pipe network element; and supplying, by the COGW, the capability of the at least one wireless pipe network element to the capability openness object through a first interface, so that the capability openness object uses the capability of the at least one wireless pipe network element, where the first interface is an interface between the COGW and a capability openness object.

With reference to the third aspect, in a first possible implementation manner, the capability of the at least one wireless pipe network element includes at least one of the following: a service flow level capability, a user level capability, a cell level capability, a base station level capability, and a system level capability.

With reference to the third aspect, in a second possible implementation manner, the capability of the at least one wireless pipe network element includes a capability of providing atomic wireless pipe information; the converging, by a COGW, a capability of the at least one wireless pipe network element through a second interface includes: obtaining, by the COGW, the atomic wireless pipe information from the at least one wireless pipe network element through the second interface; and the supplying, by the COGW, the capability of the at least one wireless pipe network element to the capability openness object through a first interface includes: processing, by the COGW, the atomic wireless pipe information to obtain wireless pipe information, and sending, by the COGW, the wireless pipe information to the capability openness object through the first interface, where the wireless pipe information indicates a wireless pipe state.

With reference to the second possible implementation manner of the third aspect, in a third possible implementation manner, the processing, by the COGW, the atomic wireless pipe information to obtain wireless pipe information includes: performing, by the COGW, anonymization processing on user information in the atomic wireless pipe information to obtain the wireless pipe information.

With reference to the second possible implementation manner of the third aspect or the third possible implementation manner of the third aspect, in a fourth possible implementation manner, before the sending, by the COGW, the wireless pipe information to the capability openness object through the first interface, the method further includes: receiving, by the COGW, a first capability query message from the capability openness object through the first interface, where the first capability query message is used for requesting the wireless pipe information; and sending, by the COGW, a second capability query message to the at least one wireless pipe network element through the second interface according to the first capability query message, where the second capability query message is used for requesting the atomic wireless pipe information, where the obtaining, by the COGW, the atomic wireless pipe information from the at least one wireless pipe network element through the second interface includes: receiving, by the COGW through the second interface, the atomic wireless pipe information sent, according to the second capability query message, by the at least one wireless pipe network element.

With reference to the second possible implementation manner of the third aspect or the third possible implementation manner of the third aspect, in a fifth possible implementation manner, before the sending, by the COGW, the wireless pipe information to the capability openness object through the first interface, the method further includes: receiving, by the COGW, a first capability subscription message from the capability openness object through the first interface, where the first capability subscription message is used for instructing to report the wireless pipe information within a subscription time; and sending, by the COGW, a second capability subscription message to the at least one wireless pipe network element through the second interface according to the first capability subscription message, where the second capability subscription message is used for instructing the at least one wireless pipe network element to report the atomic wireless pipe information within the subscription time; where the obtaining, by the COGW, the atomic wireless pipe information from the at least one wireless pipe network element through the second interface includes: receiving, by the COGW through the second interface, the atomic wireless pipe information that is sent by the at least one wireless pipe network element within the subscription time.

With reference to the fifth possible implementation manner of the third aspect, in a sixth possible implementation manner, the method further includes: receiving, by the COGW, a first capability unsubscription message from the capability openness object through the first interface, where the first capability unsubscription message is used for instructing to stop reporting the wireless pipe information; and sending, by the COGW, a second capability unsubscription message to the at least one wireless pipe network element through the second interface according to the first capability unsubscription message, where the second capability unsubscription message is used for instructing the at least one wireless pipe network element to stop reporting the atomic wireless pipe information.

With reference to the third aspect, in a seventh possible implementation manner, the capability of the at least one wireless pipe network element includes a capability of configuring a wireless network; and the supplying, by the COGW, the capability of the at least one wireless pipe network element to the capability openness object through a first interface includes: receiving, by the COGW, a first control message from the capability openness object through the first interface, where the first control message is used for instructing the COGW to configure the wireless network; and controlling, by the COGW, through the second interface according to the first control message, the at least one wireless pipe network element to configure the wireless network.

With reference to the seventh possible implementation manner of the third aspect, in an eighth possible implementation manner, the controlling, by the COGW, through the second interface according to the first control message, the at least one wireless pipe network element to configure the wireless network includes: sending, by the COGW, a second control message to the at least one wireless pipe network element through the second interface according to the first control message, where the second control message is used for instructing to configure the wireless network.

With reference to the third aspect or any possible implementation manner of the first possible implementation manner of the third aspect to the eighth possible implementation manner of the third aspect, in a ninth possible implementation manner, before the supplying, by the COGW, the capability of the at least one wireless pipe network element to the capability openness object through a first interface, the method further includes: receiving, by the COGW, an authentication and authorization request message from the capability openness object through the first interface, where the authentication and authorization request message is used for requesting authentication on an identity of the capability openness object; and sending, by the COGW, an authentication and authorization response message to the capability openness object through the first interface, where the authentication and authorization response message is used for indicating that the authentication on the identity of the capability openness object succeeds.

With reference to the third aspect or any possible implementation manner of the first possible implementation manner of the third aspect to the ninth possible implementation manner of the third aspect, in a tenth possible implementation manner, the method further includes: receiving, by the COGW, an openable capability query message from the capability openness unit through the first interface, where the openable capability query message is used for requesting an openable capability list, and the openable capability list includes a capability of a wireless pipe network element that can be supplied to the capability openness object; and sending, by the COGW, an openable capability response message to the capability openness object through the first interface, where the openable capability response message includes the openable capability list.

With reference to the third aspect or any possible implementation manner of the first possible implementation manner of the third aspect to the tenth possible implementation manner of the third aspect, in an eleventh possible implementation manner, the method further includes: receiving, by the COGW, a capability adding request message from the capability openness object through the first interface, where the capability adding request message is used for requesting the COGW to add the capability of the at least one wireless pipe network element into the openable capability list, and the openable capability list includes the capability of the wireless pipe network element that can be supplied to the capability openness object; and sending, by the COGW, a capability adding response message to the capability openness object through the first interface, where the capability adding response message is used for indicating that the capability of the at least one wireless pipe network element is successfully added into the openable capability list.

In the embodiments of the present invention, a COGW converges a capability of at least one wireless pipe network element through a second interface, and supplies the capability of the at least one wireless pipe network element to a capability openness object through a first interface, so that the capability openness object can use the capability of the at least one wireless pipe network element, thereby implementing openness of a wireless pipe capability.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are a part of the embodiments of the present invention rather than all of the embodiments. All other embodiments obtained by a person of ordinary skill in the art based on the embodiments of the present invention without creative efforts shall fall within the protection scope of the present invention.

The technical solutions of the present invention are applicable to various communications systems, for example, a Global System for Mobile Communications (Global System of Mobile communication, GSM), a Code Division Multiple Access (Code Division Multiple Access, CDMA) system, Wideband Code Division Multiple Access (Wideband Code Division Multiple Access Wireless, WCDMA), General Packet Radio Service (General Packet Radio Service, GPRS), Long Term Evolution (Long Term Evolution, LTE), Worldwide Interoperability for Microwave Access (Worldwide Interoperability for Microwave Access, WiMAX), Time Division-Synchronous Code Division Multiple Access (Time Division-Synchronous Code Division Multiple Access, TD-SCDMA), Wireless Fidelity (Wireless Fidelity, WiFi) and Bluetooth (Bluetooth).

Figure 1:
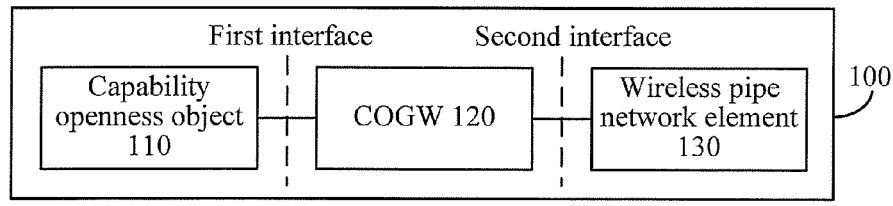
FIG. 1 is a schematic block diagram of a communications system according to an embodiment of the present invention.

FIG. 1 is a schematic block diagram of a communications system according to an embodiment of the present invention. A system 100 includes a capability openness object 110, a capability openness gateway (Capability Openness GateWay, COGW) 120, and at least one wireless pipe network element 130. It should be understood that, for ease of description, FIG. 1 shows one wireless pipe network element; however, the number of wireless pipe network elements may be larger in the embodiment of the present invention.

A first interface is provided between the COGW 120 and the capability openness object 110, and a second interface is provided between the COGW 120 and the at least one wireless pipe network element 130. The COGW 120 converges a capability of the at least one wireless pipe network element 130 through the second interface, and supplies the capability of the at least one wireless pipe network element to the capability openness object 110 through the first interface. The capability openness object 110 uses the capability of the at least one wireless pipe network element.

In the embodiment of the present invention, a COGW converges a capability of at least one wireless pipe network element through a second interface, and supplies the capability of the at least one wireless pipe network element to a capability openness object through a first interface, so that the capability openness object can use the capability of the at least one wireless pipe network element, thereby implementing openness of a wireless pipe capability.

In addition, in the embodiment of the present invention, the COGW supplies the capability of the at least one wireless pipe network element to the capability openness object through the first interface, so that the capability openness object can use the capability of the at least one wireless pipe network element; therefore, the capability openness object can improve quality of service based on an opened wireless pipe capability, and can also bring diversified experience to a user.

In addition, in the embodiment of the present invention, the COGW converges the capability of the at least one wireless pipe network element through the second interface, so that multi-layered and diversified openness and operation of the wireless pipe capability can be implemented.

It should be understood that, in the embodiment of the present invention, the wireless pipe network element may refer to a network element in a wireless communications system, and network elements together form a "wireless pipe"; therefore, in the embodiment of the present invention, the network elements may be generally referred to as wireless pipe network elements. The wireless pipe network element may include a network element in various communications systems, which, for example, may be a network element in a communications system such as GSM/GPRS, WCDMA/High Speed Packet Access (High Speed Packet Access, HSPA), LTE, CDMA or WiFi.

The COGW may be a gateway between the wireless pipe network element and the capability openness object. The COGW may converge the capability of the wireless pipe network element through the second interface, and supply the capability of the wireless pipe network element to the capability openness object through the first interface. The capability openness object may refer to an object to which the capability of the wireless pipe network element is opened. The capability openness object may use the capability of the wireless pipe network element supplied through the first interface by the COGW.

It should be further understood that, the COGW may converge the capability of the wireless pipe network element through the second interface, and therefore the second interface may also be referred to as an interface for capability convergence (Interface for Capability Convergence, IF_CC). The COGW may supply the capability of the wireless pipe network element to the capability openness object through the first interface, and therefore the first interface may also be referred to as an interface for capability supply (Interface for Capability Supply, IF_CS). Various protocols, for example, the simple object access protocol (Simple Object Access Protocol, SOAP), the representational state transfer (Representational State Transfer, REST) Protocol or other protocols, may be used on the first interface. The first interface and the second interface may be logical interfaces, where the first interface may be implemented through one or more physical interfaces, and the second interface may also be implemented through one or more physical interfaces, which are not limited in the embodiment of the present invention.

The capability of the wireless pipe network element 130 may be a service, or the like that can be supplied by the wireless pipe network element 130.

Optionally, as an embodiment, the capability of the at least one wireless pipe network element 130 may include at least one of the following: a service flow level capability, a user level capability, a cell level capability, a base station level capability, and a system level capability.

The capability of the at least one wireless pipe network element 130 may include capabilities of various levels. For example, the service flow level capability may include a service flow related capability such as providing policy and charging control for a service flow, or providing a state report of a service flow, and the like. The user level capability may include a user equipment related capability such as providing a user signal quality parameter, and the like. The cell level capability may include a cell related capability such as providing a cell load state parameter, and the like. The base station level capability may include a base station related capability such as providing a base station transmission usage parameter, and the like. The system level capability may include a system related capability, for example, providing system level statistical information or big data mining information.

Optionally, as an embodiment, the capability openness object may include at least one of the following: an application function (Application Function, AF) device and a user equipment (User equipment, UE).

For example, the AF may include at least one of the following: a third-party application, an operator proprietary application, an enterprise/industrial application, an Internet Protocol Multimedia Subsystem (Internet Protocol Multimedia Subsystem, IMS), and a content delivery network (Content Delivery Network, CDN). For example, the third-party application may be an OTT (Over the Top) application, or the like. The operator proprietary application may be a consumer oriented proprietary service, or the like. The enterprise/industrial application may be a mobile office, mobile payment, M2M, or the like.

The UE may be a UE directly oriented to a customer, and may also be referred to as a mobile terminal (Mobile Terminal, MT), a mobile user equipment, or the like, for example, may be a mobile phone (or referred to as a "cellular" phone) or a computer having a mobile terminal, for example, may be a portable, pocket-sized, handheld, computer built-in, or vehicle-mounted mobile apparatus.

It should be understood that, when the capability openness object 110 is a UE, the second interface may be a portal interface (Portal) provided by the COGW, and the UE may communicate with the COGW through the portal interface to use the capability of the at least one wireless pipe network element.

Optionally, as another embodiment, each wireless pipe network element in the at least one wireless pipe network element 130 may include a COGW agent module. The second interface may be provided between the COGW and the COGW agent module.

The COGW agent module may be an agent (Agent) of the COGW in the wireless pipe network element 130, and the second interface may be provided between the COGW and the COGW agent module, so that communication between the COGW and the wireless pipe network element 130 can be implemented.

The COGW agent module may exist as an independent module in the wireless pipe network element 130, or a corresponding function of the COGW agent module may be implemented by an existing module in the wireless pipe network element 130, or the COGW agent module is distributed in modules of the wireless pipe network element 130 in a hidden manner. For example, assuming that the wireless pipe network element 130 is a policy and charging rules function (Policy and Charging Rule Function, PCRF) device, the CORW agent module may be an existing Rx interface processing module in the PCRF. The Rx interface is an interface between the PCRF and an AF defined in the 3rd Generation Partnership Project (3rd Generation Partnership Project, 3GPP) protocol. For specific descriptions, reference may be made to the prior art.

Optionally, as another embodiment, the capability of the at least one wireless pipe network element 130 may include a capability of providing atomic wireless pipe information. The COGW 120 may obtain the atomic wireless pipe information from the at least one wireless pipe network element through the second interface, and process the atomic wireless pipe information to obtain wireless pipe information, where the wireless pipe information indicates a wireless pipe state. The capability openness object 110 obtains the wireless pipe information from the COGW 120 through the first interface.

The capability of the at least one wireless pipe network element 130 may include the capability of providing the atomic wireless pipe information. The atomic wireless pipe information may refer to information that can be directly provided by each wireless pipe network element. The atomic wireless pipe information may include at least one of the following: service flow level information, user level information, cell level information, base station level information, and system level information. For example, the service flow level information may include a QoS parameter, and the like. The user level information may include a user signal quality parameter, and the like. The cell level information may include a cell load state parameter, and the like. The base station level information may include a base station transmission load state parameter, and the like. The system level information may include system level statistical information or data mining information, and the like.

The COGW 120 may obtain the atomic wireless pipe information from the at least one wireless pipe network element 130 through the second interface. For example, the second interface may be provided between the COGW 120 and the COGW agent module in the at least one wireless pipe network element 130, so that the COGW 120 may obtain the atomic wireless pipe information from the COGW agent module through the second interface.

The COGW may process the obtained atomic wireless pipe information, such as summarization, transparent transmission, statistics, or data mining, so as to obtain the wireless pipe information. The wireless pipe information may indicate a wireless pipe state. The atomic wireless pipe information may include at least one of the following: the service flow level information, the user level information, the cell level information, the base station level information, and the system level information; therefore, the wireless pipe information may also correspondingly include at least one of the following: the service flow level information, the user level information, the cell level information, the base station level information, and the system level information. For example, wireless pipe information at a service flow level may include a QoS parameter, and the like. Wireless pipe information at a user level may include a user signal quality parameter, and the like. Wireless pipe information at a cell level may include a cell load state parameter, and the like. Wireless pipe information at a base station level may include a base station transmission load state parameter, and the like. Wireless pipe information at a system level may include system level statistical information or data mining information, and the like.

Optionally, as another embodiment, the COGW 120 may perform anonymization processing on user information in the atomic wireless pipe information to obtain wireless pipe information.

To protect user privacy, the COGW 120 may perform anonymization processing on the user information in the atomic wireless pipe information. For example, the COGW 120 needs to provide information about all users in a specified cell for the capability openness object 110. The user information may involve user privacy information such as a password, a bank account, or a name; therefore, the COGW 120 may perform anonymization processing on these pieces of user information.

The COGW 120 may perform anonymization processing on the user information in various manners such as a mapping table manner or an encryption manner. The user information after anonymization processing can be restored and identified only by the COGW 120. The capability openness object 110 cannot obtain real user information. For example, a mapping table in the mapping table manner and a key in the encryption manner may be stored in the COGW 120 and cannot be exposed to the capability openness object 110.

In this way, in the embodiment of the present invention, anonymization processing on the user information can be supported, so that the wireless pipe capability is opened and protection for user privacy can also be provided.

Optionally, as another embodiment, before obtaining the wireless pipe information from the COGW 120 through the first interface, the capability openness object 110 may further send a first capability query message to the COGW 120 through the first interface, where the first capability query message is used for requesting the wireless pipe information. The COGW 120 may send a second capability query message to the at least one wireless pipe network element 130 through the second interface according to the first capability query message, where the second capability query message is used for requesting the atomic wireless pipe information. The at least one wireless pipe network element 130 may send the atomic wireless pipe information to the COGW 120 through the second interface according to the second capability query message.

Specifically, the capability openness object 110 may request the wireless pipe information from the COGW 120 by using the first capability query message. For example, the first capability query message may include an identifier or a type of the requested information, or the like.

The COGW 120 may request the atomic wireless pipe information from the at least one wireless pipe network element 130 by using the second capability query message. For example, the COGW 120 may send the second capability query message to the COGW agent module in the wireless pipe network element. After receiving the second capability query message, the COGW agent module may obtain the atomic wireless pipe information from another module inside the wireless pipe network element, and then send the atomic wireless pipe information to the COGW 120 through the second interface. The second capability query message may carry an identifier or a type of the requested information, or the like.

Optionally, as another embodiment, before obtaining the wireless pipe information from the COGW 120 through the first interface, the capability openness object 110 may further send a first capability subscription message to the COGW 120 through the first interface, where the first capability subscription message is used for instructing the COGW 120 to report the wireless pipe information within a subscription time. The COGW 120 may further send a second capability subscription message to the at least one wireless pipe network element 130 through the second interface according to the first capability subscription message, where the second capability subscription message is used for instructing the at least one wireless pipe network element 130 to report the atomic wireless pipe information within a subscription time. The at least one wireless pipe network element 130 may send the atomic wireless pipe information to the COGW 120 through the second interface within the subscription time.

The capability openness object 110 may obtain the wireless pipe information in a subscription manner. The first capability subscription message may instruct the COGW 120 to report the wireless pipe information within the subscription time. For example, the first capability subscription message may include the subscription time, the identifier or the type of the subscribed information, and the like.

After receiving the first capability subscription message, the COGW 120 may also obtain the atomic wireless pipe information from the at least one wireless pipe network element 130 in a subscription manner. For example, the COGW 120 may send a second capability subscription message to the COGW agent module in the wireless pipe network element 130. The second capability subscription message may instruct the at least one wireless pipe network element 130 to report the atomic wireless pipe information within the subscription time. For example, the second capability subscription message may include the subscription time, the identifier or the type of the subscribed information, or the like. In this way, after receiving the second capability subscription message, the COGW agent module may obtain the subscribed atomic wireless pipe information from another module inside the wireless pipe network element, and may report the atomic wireless pipe information to the COGW 120 within the subscription time, for example, may report the atomic wireless pipe information periodically or aperiodically. After receiving the atomic wireless pipe information, the COGW 120 processes the atomic wireless pipe information to obtain the wireless pipe information and reports the wireless pipe information to the capability openness object 110, for example, may report the wireless pipe information periodically or aperiodically.

In addition, after receiving the second capability subscription message, the wireless pipe network element may send a second capability subscription response message to the COGW 120, where the second capability subscription response message may indicate that the subscription succeeds. After receiving the second capability subscription response message, the COGW 120 may send a first capability subscription response message to the capability openness object 110, where the first capability subscription response message may indicate that the subscription succeeds.

In this way, the capability openness object obtains the wireless pipe information in the subscription manner, so that a change in the wireless pipe state can be continuously traced, and the quality of service can be improved.

Optionally, as another embodiment, the capability openness object 110 may further send a first capability unsubscription message to the COGW 120 through the first interface, where the first capability unsubscription message is used for instructing the COGW 120 to stop reporting the wireless pipe information. The COGW 120 may further send a second capability unsubscription message to the at least one wireless pipe network element 130 through the second interface according to the first capability unsubscription message, where the second capability unsubscription message is used for instructing the at least one wireless pipe network element 130 to stop reporting the atomic wireless pipe information.

For example, when the capability openness object 110 does not need the wireless pipe information, the capability openness object 110 may instruct, by using the first capability unsubscription message, the COGW 120 to unsubscribe, that is, stop reporting the wireless pipe information. After receiving the first capability unsubscription message, the COGW 120 may send a second capability unsubscription message to wireless pipe network elements that have received the second capability subscription message before, so as to instruct these wireless pipe network elements to stop reporting the atomic wireless pipe information.

Optionally, as another embodiment, the capability of the at least one wireless pipe network element 130 may include a capability of configuring a wireless network. The capability openness object 110 may send a first control message to the COGW 120 through the first interface, where the first control message is used for instructing the COGW to configure the wireless network. The COGW 120 may control, through the second interface according to the first control message, the at least one wireless pipe network element 130 to configure the wireless network.

For example, the configuration on the wireless network may include setting of a related parameter and the like of the wireless network, for example, modification of a quality of service (Quality of Service, QoS) parameter, and setting of a list of uniform resource locators (Uniform Resource Locator, URL) accessible to the UE. The configuration on the wireless network may further include resource configuration on the wireless network, for example, configuration on a virtual resource of a hardware in the wireless network, such as configuration on a central processing unit (Central Processing Unit, CPU) resource or storage resource. The configuration on the wireless network may further include other configuration on the wireless network, which is not limited in the embodiment of the present invention.

The configuration on the wireless network may include at least one of the following: a service flow level configuration, a user level configuration, a cell level configuration, a base station level configuration, and a system level configuration. For example, similar to the level classification for the wireless pipe information, the service flow level configuration on the wireless network may include configuration on a service flow related parameter, and the like. The user level configuration may include configuration on a UE related parameter, and the like. The cell level configuration may include configuration on a cell related parameter, and the like. The base station level configuration may include configuration on a base station related parameter, and the like. The system level configuration may include configuration on an entire-network related parameter, and the like.

The capability openness object 110 may instruct, by using the first control message, the COGW 120 to configure the wireless network. For example, the first control message may include an identifier of a capability, an identifier of a parameter that needs to be configured, and the like. The identifier of the capability may indicate that the capability is a configuration capability on the wireless network. After receiving the first control message, the COGW 120 may control the corresponding wireless pipe network element to configure the wireless network.

Optionally, as another embodiment, the COGW 120 may send a second control message to the at least one wireless pipe network element 130 through the second interface according to the first control message, where the second control message is used for instructing to configure the wireless network. The at least one wireless pipe network element 130 may configure the wireless network according to the second control message.

The COGW 120 may instruct, by using the second control message, the wireless pipe network element to configure the wireless network. For example, the COGW 120 may send the second control message to the COGW agent module in the wireless pipe network element 130. The second control message may include an identifier of a capability, an identifier of a parameter that needs to be configured, and the like. The COGW agent module may complete configuration on the wireless network together with another module inside the wireless pipe network element according to the second control message.

In addition, after completing the configuration on the wireless network, the wireless pipe network element may send a second response message to the COGW 120, where the second response message may indicate that the configuration on the wireless network is completed. For example, the wireless pipe network element may send the second response message to the COGW 120 by using the COGW agent module in the wireless pipe network element. After receiving the second response message, the COGW 120 may send a first response message to the capability openness object 110, where the first response message may indicate that the configuration on the wireless network is completed.

Optionally, as another embodiment, before using the capability of the at least one wireless pipe network element 130, the capability openness object 110 may further send an authentication and authorization request message to the COGW 120 through the first interface, where the authentication and authorization request message is used for requesting authentication on an identity of the capability openness object 110. The COGW 120 may further send an authentication and authorization response message to the capability openness object 110 through the first interface, where the authentication and authorization response message is used for indicating that the authentication on the identity of the capability openness object 110 succeeds.

Before using the capability of the wireless pipe network element, the capability openness object 110 needs to pass the authentication of the COGW 120. For example, the authentication and authorization request message may include the identity and a key of the capability openness object 110. For example, in an authentication and authorization manner using a user name/password manner, the authentication and authorization request message may include a user name and a password of the capability openness object 110.

After the capability openness object 110 succeeds the authentication of the COGW 120, the COGW 120 may authorize the capability openness object 110 to use the capability of the wireless pipe network element, and may generate a use record of the capability openness object 110 and perform charging.

Optionally, as another embodiment, the capability openness object 110 may further send an openable capability query message to the COGW through the first interface, where the openable capability query message is used for requesting an openable capability list, and the openable capability list includes a capability of a wireless pipe network element that can be supplied to the capability openness object 110. The COGW 120 may further send an openable capability response message to the capability openness object 110 through the first interface, where the openable capability response message includes the openable capability list.

The capability openness object 110 may obtain the openable capability list from the COGW 120 through the openable capability query message, so as to learn about a capability of the wireless pipe network element that can be used.

Optionally, as another embodiment, the capability openness object 110 may further send a capability adding request message to the COGW 120 through the first interface, where the capability adding request message is used for requesting the COGW 120 to add the capability of the at least one wireless pipe network element into the openable capability list, and the openable capability list includes the capability of the wireless pipe network element that can be supplied to the capability openness object 110. The COGW 120 may further send a capability adding response message to the capability openness object 110 through the first interface, where the capability adding response message is used for indicating that the capability of the at least one wireless pipe network element is successfully added into the openable capability list.

In this way, the COGW may add, based on a demand of the capability openness object, the capability of the wireless pipe network element that can be supplied, so that the quality of service of the capability openness object can be better improved.

Optionally, as another embodiment, the COGW 120 may include a first group of sub-COGWs and a second group of sub-COGWs; and the first interface is provided between the first group of sub-COGWs and the capability openness object 110, the first group of sub-COGWs is connected to the second group of sub-COGWs, the first group of sub-COGWs include 1 sub-COGW, and the second group of sub-COGWs include n sub-COGWs.

The n sub-COGWs in the second group of sub-COGWs are in a one-to-one correspondence with n groups of wireless pipe network elements, the second interface is provided between each sub-COGWs and its corresponding group of wireless pipe network elements, and the n groups of wireless pipe network elements are obtained by grouping the at least one wireless pipe network element, where n is a positive integer.

Optionally, as another embodiment, the n groups of wireless pipe network elements may be obtained by grouping, according to a region in which the at least one wireless pipe network element is located, the at least one wireless pipe network element; or, the n groups of wireless pipe network elements may be obtained by grouping, according to a manufacturer of the at least one wireless pipe network element, the at least one wireless pipe network element; or, the n groups of wireless pipe network elements may be obtained by grouping, according to an operator to which the at least one wireless pipe network element belongs, the at least one wireless pipe network element.

Optionally, as another embodiment, the second group of sub-COGWs and the at least one wireless pipe network element may be located at a same geographical location, or the second group of sub-COGWs may be located inside the at least one wireless pipe network element.

In actual deployment, the COGW 120 may use various deployment manners, for example, an entire single network element deployment manner, a region-based layered deployment manner, a function-based separate deployment manner, or the like.

In the entire single network element deployment manner, the COGW 120 may be deployed as a physical entity.

In layered deployment, the COGW 120 may include two groups of sub-COGWs. The first group of sub-COGWs may include 1 sub-COGW, and the second group of sub-COGWs may include n sub-COGWs. When n is 1, the COGW 120 includes 2 sub-COGWs, and the 2 sub-COGWs may be deployed in a layered mode based on functions.

When n is greater than 1, the first group of sub-COGWs and the second group of sub-COGWs may be deployed in a layered mode by grouping the sub-COGWs based on a region in which the wireless pipe network element is located, a manufacturer of the wireless pipe network element, an operator to which the wireless pipe network element belongs, or the like. The second group of sub-COGWs and the wireless pipe network element may be located at a same geographical location, or the second group of sub-COGWs may also be located inside the wireless pipe network element.

The following describes the embodiment of the present invention in detail with reference to specific examples. It should be understood that, examples in FIG. 2 to FIG. 3g are used only to help a person skilled in the art to better understand the embodiment of the present invention rather than to limit the scope of the embodiment of the present invention.

Figure 2:
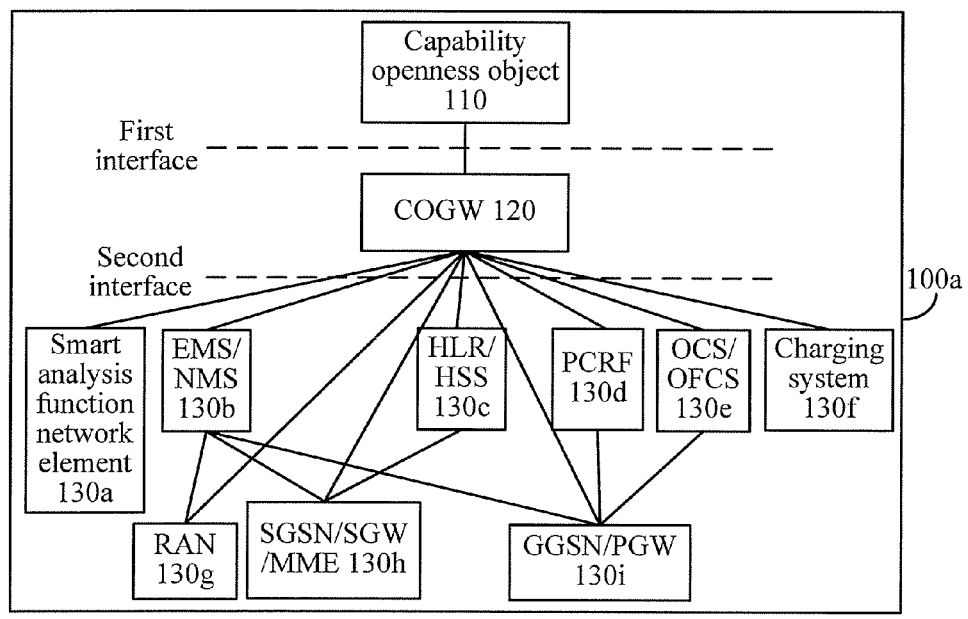
FIG. 2 is a schematic diagram of an example of a communications system according to an embodiment of the present invention.

FIG. 2 is a schematic diagram of an example of a communications system according to an embodiment of the present invention.

At least one wireless pipe network element may include a network element in various wireless communications standards, for example, may include the following:

GSM/GPRS: a base station (Base Transceiver Station, BTS), a base station controller (Base Station Controller, BSC), a serving GPRS support node (Service GPRS Support Node, SGSN), a gateway GPRS support node (Gateway GPRS Support Node, GGSN), and a mobile switching center (Mobile Switching Center, MSC)/visitor location register (Visiting Location Register, VLR);

WCDMA/HSPA: a base station (NodeB), a radio network controller (Radio Network Controller, RNC), an SGSN, a GGSN, and an MSC/VLR;

LTE: an evolved base station (evolved Node B, eNodeB), a mobility management entity (Mobility Management Entity, MME), a serving gateway (Serving Gateway, SGW), and a packet data network gateway (Packet Data Network GateWay, PGW);

CDMA: a BTS, a BSC, a packet data serving node (Packet Data Serving Node, PDSN), and an MSC/VLR;

WiFi: an access point (Access Point, AP), and an access controller (Access Controller, AC);

Public: a PCRF, a home location register (Home Location Register, HLR), a home subscriber server (Home Subscriber Server, HSS), a charging gateway functionality (Charging Gateway Functionality, CGF), an equipment identity register (Equipment Identity Register, EIR), an access network discovery and selection function (Access Network Discovery Support Functions, ANDSF) unit, an evolved packet data gateway (evolved Packet Data Gateway, ePDG), a short messaging service (Short Messaging Service, SMS), an online charging system (Online Charging Systems, OCS)/ offline charging system (Offline Charging System, OFCS), and a billing system (Billing system); and Network management and other analysis and statistics network elements: an element management system (Element Management System, EMS), a network management system (Network Management System, NMS), and a smart analysis function (Smart Analysis Function) network element;

where the GSM/GPRS, WCDMA/HSPA, LTE standards are defined by the 3GPP standard organization, the CDMA is defined by the 3GPP2 standard organization, and the WiMAX and the WiFi are defined by the Institute of Electrical and Electronics Engineers (Institute of Electrical and Electronics Engineers, IEEE) standard organization.

In a system 100a shown in FIG. 2, a first interface may be provided between a COGW 120 and a capability openness object 110, and a second interface may be provided between the COGW 120 and multiple wireless pipe network elements 130a to 130i. For example, the second interface may be provided between the COGW 120 and a smart analysis function network element 130a, an EMS/NMS 130b, an HLR/HSS 130c, a PCRF 130d, an OCS/OFCS 130e, a charging system 130f, a radio access network (Radio Access Network, RAN) 130g, an SGSN/SGW/MME 130h, and a GGSN/PGW 130i.

As can be seen, the second interface is provided between the COGW 120 and the OCS/OFCS 130e and between the COGW 120 and the charging system 130f, and therefore the COGW 120 may work with the OCS/OFCS 130e and the charging system 130f to complete a charging function.

The COGW 120 may converge a capability of the wireless pipe network elements 130a to 130i through the second interface, and supply the capability of the wireless pipe network elements 130a to 130i to the capability openness object 110 through the first interface. The capability openness object 110 can use the capability of the wireless pipe network elements 130a to 130i.

Each wireless pipe network element in the wireless pipe network elements 130a to 130i may include a COGW agent module. The second interface may be specifically provided between the COGW 120 and the COGW agent module in each wireless pipe network element.

In addition, for communication relationships between the wireless pipe network elements, reference may be made to the prior art. For example, the EMS/NMS 130b may communicate with the RAN 130g, the SGSN/SGW/MME 130h, and the GGSN/PGW 130i. The HLR/HSS 130c may communicate with the SGSN/SGW/MME 130h. The PCRF 130d may communicate with the GGSN/PGW 130i. For specific content, reference may be made to the prior art, which is not described herein again.

In the embodiment of the present invention, a COGW converges a capability of at least one wireless pipe network element through a second interface, and supplies the capability of the at least one wireless pipe network element to a capability openness object through a first interface, so that the capability openness object can use the capability of the at least one wireless pipe network element, thereby implementing openness of a wireless pipe capability.

Figure 3A:
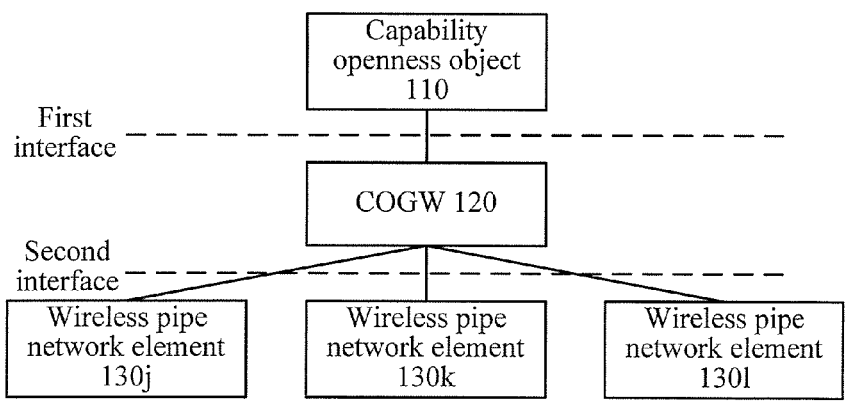
FIG. 3a is a schematic diagram of an example of a deployment manner of a communications system according to an embodiment of the present invention.

FIG. 3a is a schematic diagram of an example of a deployment manner of a communications system according to an embodiment of the present invention. It should be understood that, for ease of description, three wireless pipe network elements 130j to 130l are shown in FIG. 3a. However, in the embodiment of the present invention, there may be more or less wireless pipe network elements.

In actual deployment, as shown in FIG. 3a, a COGW 120 may be deployed as a physical entity, and converge capability of the wireless pipe network elements 130j to 130l through a second interface, and supply the capability of the wireless pipe network elements 130j to 130l to the capability openness object 110 through a first interface.

Figure 3B:
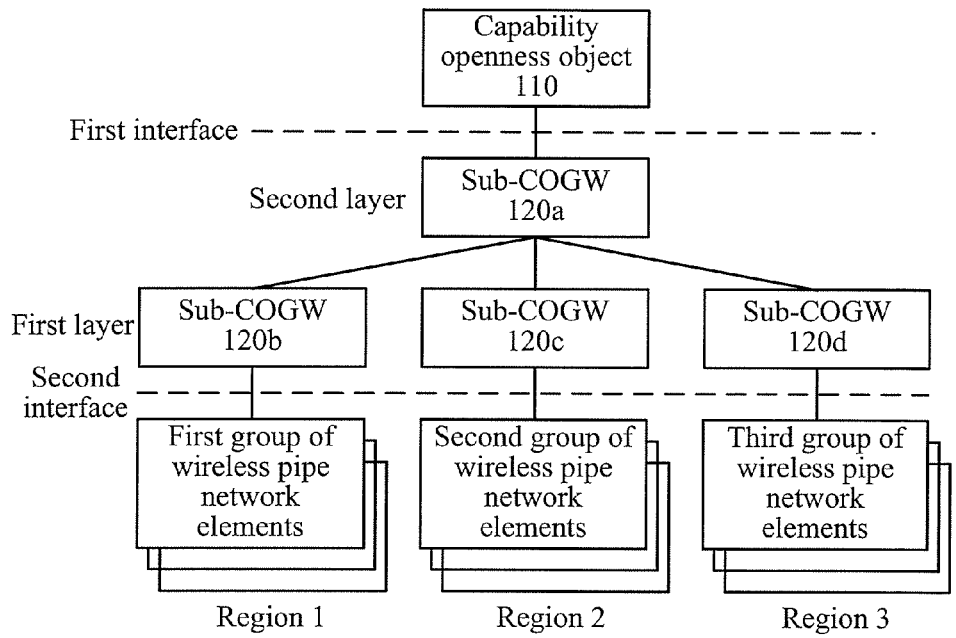
FIG. 3b is a schematic diagram of another example of a deployment manner of a communications system according to an embodiment of the present invention.

FIG. 3b is a schematic diagram of another example of a deployment manner of a communications system according to an embodiment of the present invention.

In actual deployment, layered deployment may be performed on a COGW based on a region in which a wireless pipe network element is located. The COGW may include a first group of sub-COGWs and a second group of sub-COGWs. The first group of sub-COGWs may be deployed at a second layer, and the second group of sub-COGWs may be deployed at a first layer. That is, a first interface is provided between the first group of sub-COGWs and a capability openness object 110, and a second interface is provided between the second group of sub-COGWs and the wireless pipe network element. The first group of sub-COGWs is connected to the second group of sub-COGWs.

As shown in FIG. 3b, the first group of sub-COGWs may include a sub-COGW 120a. The second group of sub-COGWs may include a sub-COGW 120b, a sub-COGW 120c, and a sub-COGW 120d.

Each sub-COGW in the second group of sub-COGWs corresponds to one group of wireless pipe network elements. Each group of wireless pipe network elements may be obtained by grouping the wireless pipe network elements based on a region. As shown in FIG. 3b, a first group of wireless pipe network elements may be located in a region 1, a second wireless pipe network element may be located in a region 2, and a third group of wireless pipe network elements may be located in a region 3.

Each sub-COGW in the second group of sub-COGWs may converge capabilities of each corresponding group of wireless pipe network elements through the second interface. For example, the sub-COGW 120b may converge capability of the first group of wireless pipe network elements, the sub-COGW 120c may converge capability of the second group of wireless pipe network elements, and the sub-COGW 120d may converge capability of the third group of wireless pipe network elements.

The first group of sub-COGWs may converge the capability of the wireless pipe network elements converged by the second group of sub-COGWs, and supply the capability of the three groups of wireless pipe network elements to the capability openness object 110 through the first interface.

It should be understood that, although three groups of wireless pipe network elements are shown in FIG. 3b, in the embodiment of the present invention, there may be more or less groups of wireless pipe network elements, and the second group of sub-COGWs may also correspondingly include more or less sub-COGWs.

Figure 3C:
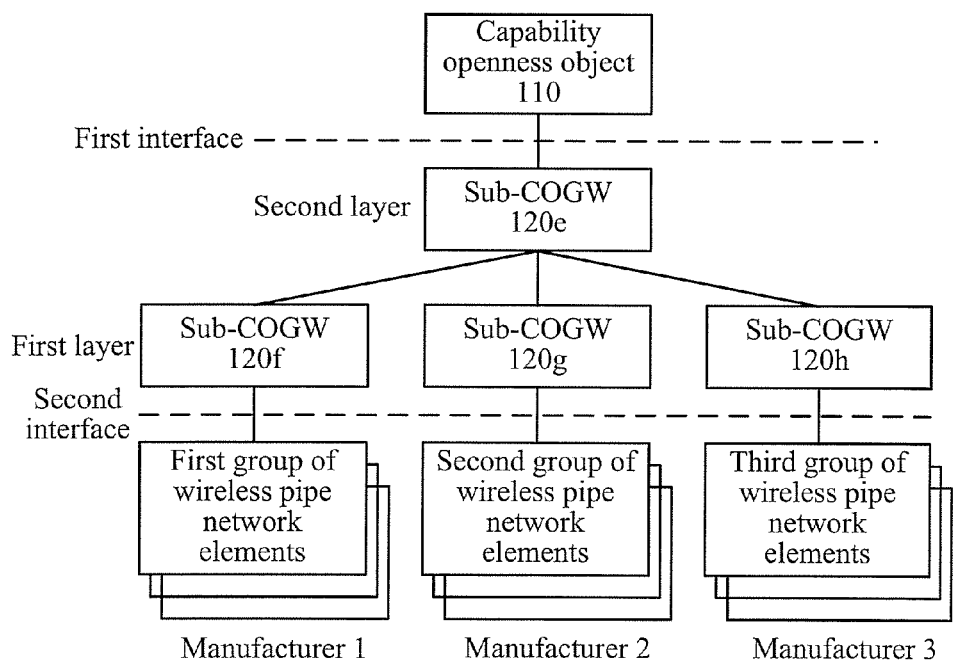
FIG. 3c is a schematic diagram of another example of a deployment manner of a communications system according to an embodiment of the present invention.

FIG. 3c is a schematic diagram of another example of a deployment manner of a communications system according to an embodiment of the present invention.

In actual deployment, layered deployment may be performed on a COGW based on a manufacturer of a wireless pipe network element. Similar to the deployment manner in FIG. 3b, the COGW may include a first group of sub-COGWs and a second group of sub-COGWs. The first group of sub-COGWs may be deployed at a second layer, and the second group of sub-COGWs may be deployed at a first layer. That is, a first interface is provided between the first group of sub-COGWs and a capability openness object 110, and a second interface is provided between the second group of sub-COGWs and the wireless pipe network element. The first group of sub-COGWs is connected to the second group of sub-COGWs.

As shown in FIG. 3c, the first group of sub-COGWs may include a sub-COGW 120e. The second group of sub-COGWs may include a sub-COGW 120f, a sub-COGW 120g, and a sub-COGW 120h.

Each sub-COGW in the second group of sub-COGWs corresponds to one group of wireless pipe network elements. Each group of wireless pipe network elements may be obtained by grouping the wireless pipe network elements based on manufacturers of the wireless pipe network elements. As shown in FIG. 3c, a first group of wireless pipe network elements may belong to a manufacturer 1, a second wireless pipe network element may belong to a manufacturer 2, and a third group of wireless pipe network elements may belong to a manufacturer 3.

Each sub-COGW in the second group of sub-COGWs may converge a capability of each corresponding group of wireless pipe network elements through the second interface. For example, the sub-COGW 120f may converge a capability of the first group of wireless pipe network elements, the sub-COGW 120g may converge a capability of the second group of wireless pipe network elements, and the sub-COGW 120h may converge a capability of the third group of wireless pipe network elements.

The first group of sub-COGWs may converge the capability of the wireless pipe network elements converged by the second group of sub-COGWs, and supply the capability of the three groups of wireless pipe network elements to the capability openness object 110 through the first interface.

It should be understood that, although three groups of wireless pipe network elements are shown in FIG. 3c, in the embodiment of the present invention, there may be more or less groups of wireless pipe network elements, and the second group of sub-COGWs may also correspondingly include more or less sub-COGWs.

Figure 3D:
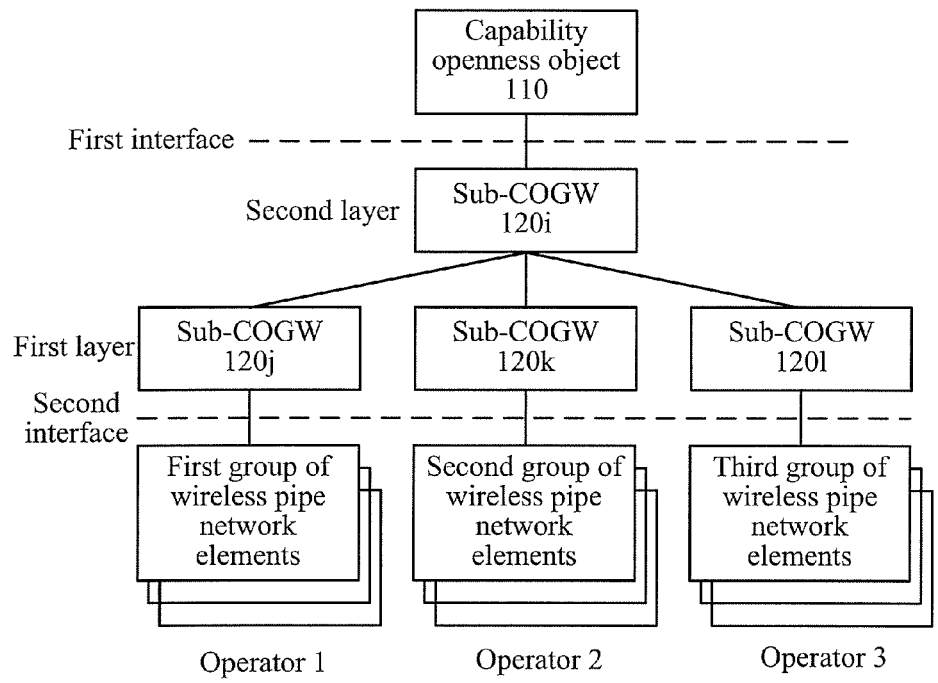
FIG. 3d is a schematic diagram of another example of a deployment manner of a communications system according to an embodiment of the present invention.

FIG. 3d is a schematic diagram of another example of a deployment manner of a communications system according to an embodiment of the present invention.

In actual deployment, layered deployment may be performed on a COGW based on an operator to which a wireless pipe network element belongs. Similar to the deployment manners shown in FIG. 3b and FIG. 3c, the COGW may include a first group of sub-COGWs and a second group of sub-COGWs. The first group of sub-COGWs may be deployed at a second layer, and the second group of sub-COGWs may be deployed at a first layer. That is, a first interface is provided between the first group of sub-COGWs and a capability openness object 110, and a second interface is provided between the second group of sub-COGWs and the wireless pipe network element. The first group of sub-COGWs is connected to the second group of sub-COGWs.

As shown in FIG. 3d, the first group of sub-COGWs may include a sub-COGW 120i. The second group of sub-COGWs may include a sub-COGW 120j, a sub-COGW 120k, and a sub-COGW 120l.

Each sub-COGW in the second group of sub-COGWs corresponds to one group of wireless pipe network elements. Each group of wireless pipe network elements may be obtained by grouping the wireless pipe network elements based on operators to which tbelong. As shown in FIG. 3d, a first group of wireless pipe network elements may belong to an operator 1, a second wireless pipe network element may belong to an operator 2, and a third group of wireless pipe network elements may belong to an operator 3.

Each sub-COGW in the second group of sub-COGWs may converge a capability of each corresponding group of wireless pipe network elements through the second interface, and the first group of sub-COGWs may converge the capability of the wireless pipe network elements converged by the second group of sub-COGWs, and supply the capability of the three groups of wireless pipe network elements to the capability openness object 110 through the first interface.

It should be understood that, although three groups of wireless pipe network elements are shown in FIG. 3d, in the embodiment of the present invention, there may be more or less groups of wireless pipe network elements, and the second group of sub-COGWs may also correspondingly include more or less sub-COGWs.

Figure 3E:
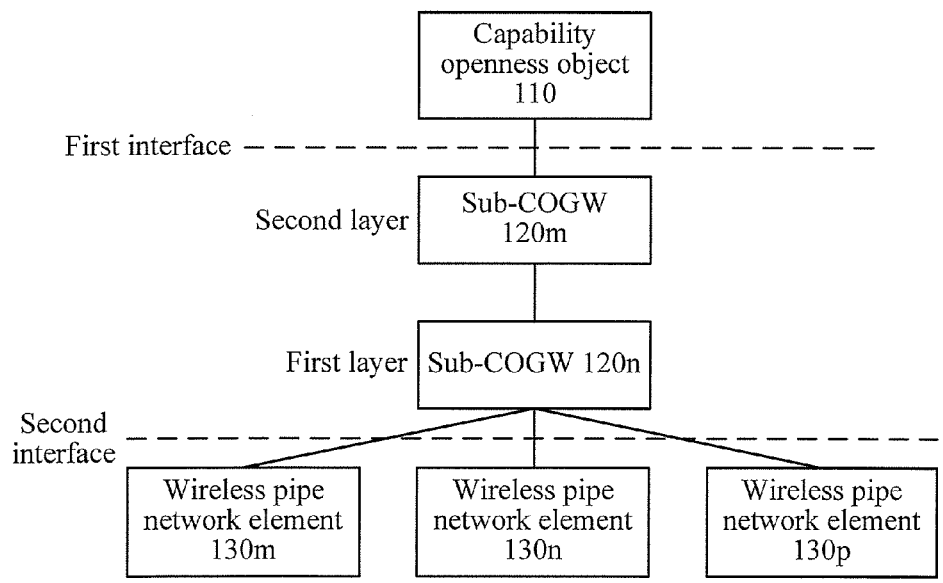
FIG. 3e is a schematic diagram of another example of a deployment manner of a communications system according to an embodiment of the present invention.

FIG. 3e is a schematic diagram of another example of a deployment manner of a communications system according to an embodiment of the present invention. It should be understood that, for ease of description, FIG. 3e shows three wireless pipe network elements 130m, 130n, and 130p. However, in the embodiment of the present invention, there may be more or less wireless pipe network elements.

In actual deployment, layered deployment may be performed on a COGW based on functional division of the COGW.

As shown in FIG. 3e, the COGW may include 2 sub-COGWs, that is, a sub-COGW 120m and a sub-COGW 120n. The sub-COGW 120m may be deployed at a second layer, and the sub-COGW 120n may be deployed at a first layer. A first interface may be provided between the sub-COGW 120m and a capability openness object 110, and a second interface may be provided between the sub-COGW 120n and the wireless pipe network elements 130m, 130n, and 130p. The sub-COGW 120m is connected to the sub-COGW 120n.

The sub-COGW 120n may converge a capability of the wireless pipe network elements 130m, 130n, and 130p through the second interface. The sub-COGW 120m may converge the capability of the wireless pipe network elements 130m, 130n, and 130p converged by the sub-COGW 120n, and supply the capability of the wireless pipe network elements 130m, 130n, and 130p to the capability openness object 110 through the first interface.

Figure 3F:
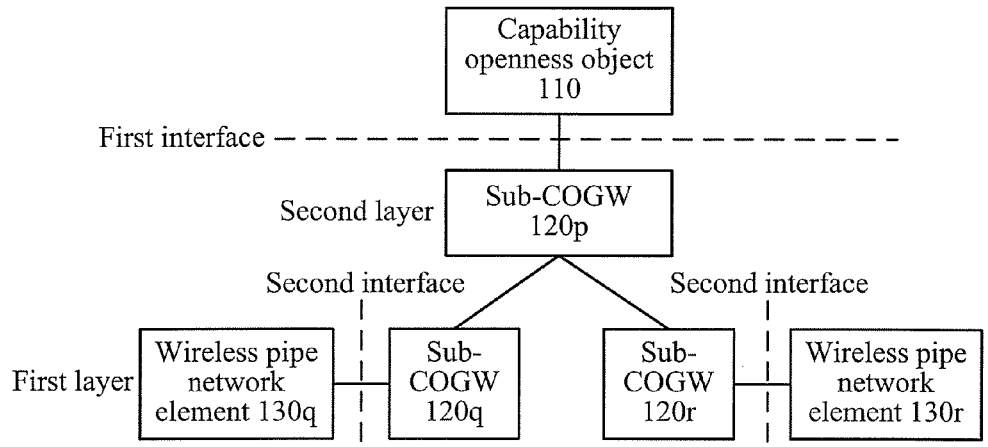
FIG. 3f is a schematic diagram of another example of a deployment manner of a communications system according to an embodiment of the present invention.
Figure 3G:
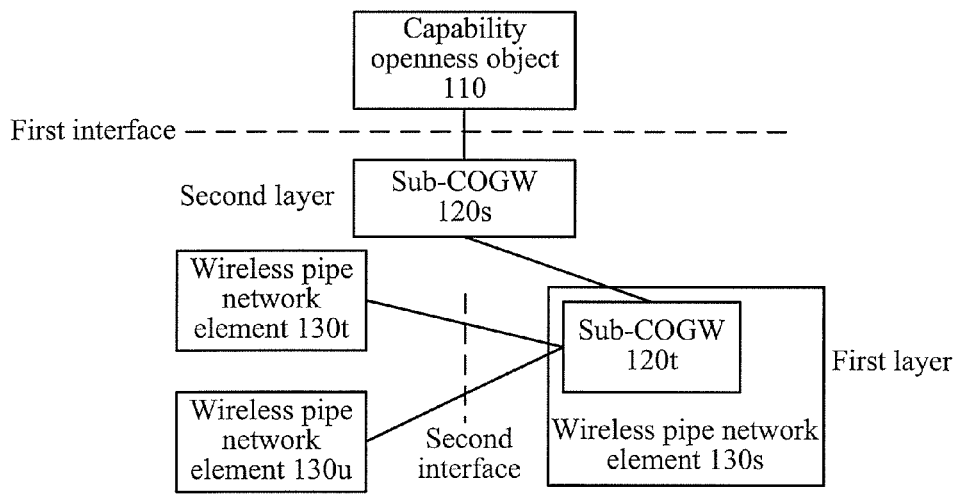
FIG. 3g is a schematic diagram of another example of a deployment manner of a communications system according to an embodiment of the present invention.

FIG. 3f is a schematic diagram of another example of a deployment manner of a communications system according to an embodiment of the present invention.

In actual deployment, layered deployment may be performed on a COGW. As shown in FIG. 3f, the COGW may include a first group of sub-COGWs and a second group of sub-COGWs. The first group of sub-COGWs may include a sub-COGW 120p, and the second group of sub-COGWs may include a sub-COGW 120q and a sub-COGW 120r. The first group of sub-COGWs may be deployed at a second layer, and the second group of sub-COGWs may be deployed at a first layer. A first interface is provided between the first group of sub-COGWs and a capability openness object 110, and a second interface is provided between the second group of sub-COGWs and a wireless pipe network element. The first group of sub-COGWs is connected to the second group of sub-COGWs.

The second group of sub-COGWs and a wireless pipe network element may be located at a same geographical location. As shown in FIG. 3f, the sub-COGW 120q and a wireless pipe network element 130q may be located at a same geographical location. For example, if the wireless pipe network element 130q is an RNC, the sub-COGW 120q may be deployed in an RNC equipment room. The sub-COGW 120r and a wireless pipe network element 130r may be located at a same geographical location. For example, if the wireless pipe network element 130r is a base station, the sub-COGW 120r may be deployed at a site of the base station.

Each sub-COGW in the second group of sub-COGWs may converge a capability of a corresponding wireless pipe network element through the second interface. The first group of sub-COGWs may converge a capability of the wireless pipe network elements 130q and 130r converged by the second group of sub-COGWs, and supply the capability of the wireless pipe network elements 130q and 130r to the capability openness object 110 through the first interface.

It should be understood that, although two wireless pipe network elements are shown in FIG. 3f, in the embodiment of the present invention, there may be more or less wireless pipe network elements, and the second group of sub-COGWs may also correspondingly include more or less sub-COGWs.

FIG. 3g is a schematic diagram of another example of a deployment manner of a communications system according to an embodiment of the present invention.

In actual deployment, layered deployment may be performed on a COGW. As shown in FIG. 3g, the COGW may include a first group of sub-COGWs and a second group of sub-COGWs. The first group of sub-COGWs may include a sub-COGW 120s, and the second group of sub-COGWs may include a sub-COGW 120t. The first group of sub-COGWs may be deployed at a second layer, and the second group of sub-COGWs may be deployed at a first layer. A first interface is provided between the first group of sub-COGWs and a capability openness object 110, and a second interface is provided between the second group of sub-COGWs and a wireless pipe network element. The first group of sub-COGWs is connected to the second group of sub-COGWs.

The sub-COGW 120t in the second group of sub-GOGWs may be located inside a wireless pipe network element 130s. The sub-COGW 120t may converge a capability of wireless pipe network elements 130s, 130t, and 130u through the second interface. It should be understood that, the second interface between the sub-COGW 120t and the wireless pipe network element 130s may be an internal interface, that is, may be an interface between the sub-COGW 120t and a COGW agent module inside the wireless pipe network element 130s.

The sub-COGW 120s in the first group of sub-COGWs may converge the capability of the wireless pipe network elements 130s, 130t, and 130u converged by sub-COGW 120t, and supply the capability of the wireless pipe network elements 130s, 130t, and 130u to the capability openness object 110 through the first interface.

It should be understood that, although three wireless pipe network elements are shown in FIG. 3g, in the embodiment of the present invention, there may be more or less wireless pipe network elements, and the second group of sub-COGWs may also correspondingly include more or less sub-COGWs.

Figure 4:
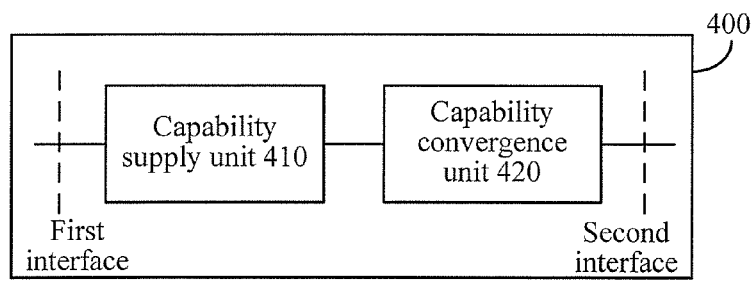
FIG. 4 is a schematic block diagram of a capability openness gateway according to an embodiment of the present invention.

FIG. 4 is a schematic block diagram of a capability openness gateway according to an embodiment of the present invention. A capability openness gateway 400 in FIG. 4 includes a capability supply unit 410 and a capability convergence unit 420.

A first interface is provided between the capability supply unit 410 and a capability openness object, and a second interface is provided between the capability convergence unit 420 and at least one wireless pipe network element.

The capability convergence unit 420 converges a capability of the at least one wireless pipe network element through the second interface. The capability supply unit 410 supplies the capability of the at least one wireless pipe network element converged by the capability convergence unit 420 to the capability openness object through the first interface, so that the capability openness object uses the capability of the at least one wireless pipe network element.

In the embodiment of the present invention, a capability of at least one wireless pipe network element is converged through a second interface, and the capability of the at least one wireless pipe network element is supplied to a capability openness object through a first interface, so that the capability openness object can use the capability of the at least one wireless pipe network element, thereby implementing openness of a wireless pipe capability.

In addition, in the embodiment of the present invention, the COGW supplies the capability of the at least one wireless pipe network element to the capability openness object through the first interface, so that the capability openness object can use the capability of the at least one wireless pipe network element; therefore, the capability openness object can improve quality of service based on the opened wireless pipe capability, and can also bring diversified experience to a user.

In addition, in the embodiment of the present invention, the COGW converges the capability of the at least one wireless pipe network element through the second interface, so that multi-layered and diversified openness and operation of the wireless pipe capability can be implemented.

Optionally, as an embodiment, the capability of the at least one wireless pipe network element may include at least one of the following: a service flow level capability, a user level capability, a cell level capability, a base station level capability, and a system level capability.

Optionally, as another embodiment, the capability of the at least one wireless pipe network element may include a capability of providing atomic wireless pipe information. The capability convergence unit 420 may obtain the atomic wireless pipe information from the at least one wireless pipe network element through the second interface. The capability supply unit 410 may process the atomic wireless pipe information obtained by the capability convergence unit 420 to obtain wireless pipe information, and send the wireless pipe information to the capability openness object through the first interface, where the wireless pipe information indicates a wireless pipe state.

Optionally, as another embodiment, the capability supply unit 410 may perform anonymization processing on user information in the atomic wireless pipe information to obtain the wireless pipe information.

Optionally, as another embodiment, before sending the wireless pipe information to the capability openness object through the first interface, the capability supply unit 410 may further receive a first capability query message from the capability openness object through the first interface, where the first capability query message is used for requesting the wireless pipe information. The capability convergence unit 420 may further send a second capability query message to the at least one wireless pipe network element through the second interface according to the first capability query message received by the capability supply unit 410, where the second capability query message is used for requesting the atomic wireless pipe information. The capability convergence unit 420 may receive, through the second interface, the atomic wireless pipe information sent, according to the second capability query message, by the at least one wireless pipe network element.

Optionally, as another embodiment, before sending the wireless pipe information to the capability openness object through the first interface, the capability supply unit 410 may further receive a first capability subscription message from the capability openness object through the first interface, where the first capability subscription message is used for instructing to report the wireless pipe information within a subscription time. The capability convergence unit 420 may further send a second capability subscription message to the at least one wireless pipe network element through the second interface according to the first capability subscription message received by the capability supply unit 410, where the second capability subscription message is used for instructing the at least one wireless pipe network element to report the atomic wireless pipe information within the subscription time. The capability convergence unit 420 may receive, through the second interface, the atomic wireless pipe information that is sent by the at least one wireless pipe network element within the subscription time.

Optionally, as another embodiment, the capability supply unit 410 may further receive a first capability unsubscription message from the capability openness object through the first interface, where the first capability unsubscription message is used for instructing to stop reporting the wireless pipe information. The capability convergence unit 420 may further send a second capability unsubscription message to the at least one wireless pipe network element through the second interface according to the first capability unsubscription message received by the capability supply unit 410, where the second capability unsubscription message is used for instructing the at least one wireless pipe network element to stop reporting atomic wireless pipe information.

Optionally, as another embodiment, the capability of the at least one wireless pipe network element includes a capability of configuring a wireless network. The capability supply unit 410 may receive a first control message from the capability openness object through the first interface, where the first control message is used for instructing the COGW to configure the wireless network. The capability convergence unit 420 may control, through the second interface according to the first control message received by the capability supply unit 410, the at least one wireless pipe network element to configure the wireless network.

Optionally, as another embodiment, the capability convergence unit 420 may send a second control message to the at least one wireless pipe network element through the second interface according to the first control message, where the second control message is used for instructing to configure the wireless network.

Optionally, as another embodiment, before supplying the capability of the at least one wireless pipe network element to the capability openness object through the first interface, the capability supply unit 410 may further receive an authentication and authorization request message from the capability openness object through the first interface, where the authentication and authorization request message is used for requesting authentication on an identity of the capability openness object. The capability supply unit 410 may further send an authentication and authorization response message to the capability openness object through the first interface, where the authentication and authorization response message is used for indicating that the authentication on the identity of the capability openness object succeeds.

Optionally, as another embodiment, the capability supply unit 410 may further receive an openable capability query message from the capability openness unit through the first interface, where the openable capability query message is used for requesting an openable capability list, and the openable capability list includes a capability of a wireless pipe network element that can be supplied to the capability openness object. The capability supply unit 410 may further send an openable capability response message to the capability openness object through the first interface, where the openable capability response message includes the openable capability list.

Optionally, as another embodiment, the capability supply unit 410 may further receive a capability adding request message from the capability openness object through the first interface, where the capability adding request message is used for requesting the COGW to add the capability of the at least one wireless pipe network element into the openable capability list, and the openable capability list includes the capability of the wireless pipe network element that can be supplied to the capability openness object. The capability supply unit 410 may further send a capability adding response message to the capability openness object through the first interface, where the capability adding response message is used for indicating that the capability of the at least one wireless pipe network element is successfully added into the openable capability list.

Figure 5:
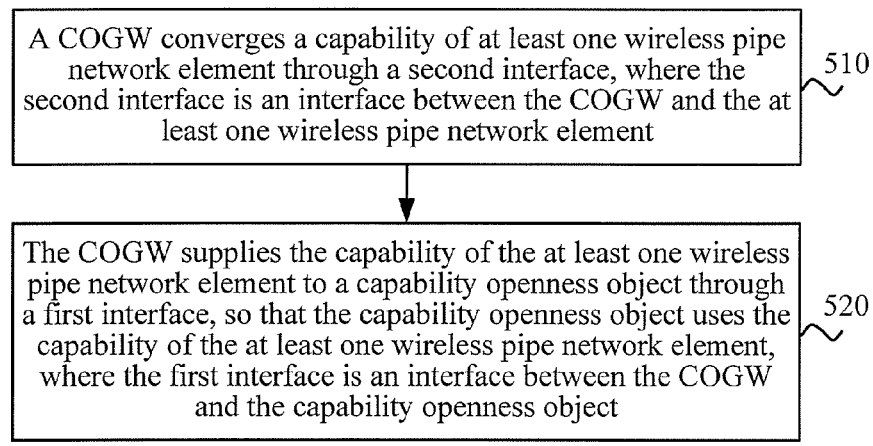
FIG. 5 is a schematic flowchart of a method for opening a wireless pipe capability according to an embodiment of the present invention.

FIG. 5 is a schematic flowchart of a method for opening a wireless pipe capability according to an embodiment of the present invention. The method in FIG. 5 is performed by a COGW.

510. The COGW converges a capability of at least one wireless pipe network element through a second interface, where the second interface is an interface between the COGW and the at least one wireless pipe network element.

520. The COGW supplies the capability of the at least one wireless pipe network element to a capability openness object through a first interface, so that the capability openness object uses the capability of the at least one wireless pipe network element, where the first interface is an interface between the COGW and the capability openness object.

In the embodiment of the present invention, a COGW converges a capability of at least one wireless pipe network element through a second interface, and supplies the capability of the at least one wireless pipe network element to a capability openness object through a first interface, so that the capability openness object can use the capability of the at least one wireless pipe network element, thereby implementing openness of a wireless pipe capability.

In addition, in the embodiment of the present invention, the COGW supplies the capability of the at least one wireless pipe network element to the capability openness object through the first interface, so that the capability openness object can use the capability of the at least one wireless pipe network element; therefore, the capability openness object can improve quality of service based on the opened wireless pipe capability, and can also bring diversified experience to a user.

In addition, in the embodiment of the present invention, the COGW converges the capability of the at least one wireless pipe network element through the second interface, so that multi-layered and diversified openness and operation of the wireless pipe capability can be implemented.

Optionally, as an embodiment, the capability of the at least one wireless pipe network element may include at least one of the following: a service flow level capability, a user level capability, a cell level capability, a base station level capability, and a system level capability.

Optionally, as another embodiment, the capability of the at least one wireless pipe network element may include a capability of providing atomic wireless pipe information. In step 510, the COGW may obtain the atomic wireless pipe information from the at least one wireless pipe network element through the second interface. In step 520, the COGW may process the atomic wireless pipe information to obtain wireless pipe information, and send the wireless pipe information to the capability openness object through the first interface, where the wireless pipe information indicates a wireless pipe state.

Optionally, as another embodiment, the COGW may perform anonymization processing on user information in the atomic wireless pipe information to obtain the wireless pipe information.

Optionally, as another embodiment, before the COGW sends the wireless pipe information to the capability openness object through the first interface, the COGW may receive a first capability query message from the capability openness object through the first interface, where the first capability query message is used for requesting the wireless pipe information, and may send a second capability query message to the at least one wireless pipe network element through the second interface according to the first capability query message, where the second capability query message is used for requesting the atomic wireless pipe information. The COGW may receive, through the second interface, the atomic wireless pipe information sent, according to the second capability query message, by the at least one wireless pipe network element.

Optionally, as another embodiment, before sending the wireless pipe information to the capability openness object through the first interface, the COGW may receive a first capability subscription message from the capability openness object through the first interface, where the first capability subscription message is used for instructing to report the wireless pipe information within a subscription time, and may send a second capability subscription message to the at least one wireless pipe network element through the second interface according to the first capability subscription message, where the second capability subscription message is used for instructing the at least one wireless pipe network element to report the atomic wireless pipe information within the subscription time. The COGW may receive, through the second interface, the atomic wireless pipe information that is sent by the at least one wireless pipe network element within the subscription time.

Optionally, as another embodiment, the COGW may receive a first capability unsubscription message from the capability openness object through the first interface, where the first capability unsubscription message is used for instructing to stop reporting the wireless pipe information. The COGW may send a second capability unsubscription message to the at least one wireless pipe network element through the second interface according to the first capability unsubscription message, where the second capability unsubscription message is used for instructing the at least one wireless pipe network element to stop reporting the atomic wireless pipe information.

Optionally, as another embodiment, the capability of the at least one wireless pipe network element includes a capability of configuring a wireless network. In step 520, the COGW may receive a first control message from the capability openness object through the first interface, where the first control message is used for instructing the COGW to configure the wireless network. The COGW may control, through the second interface according to the first control message, the at least one wireless pipe network element to configure the wireless network.

Optionally, as another embodiment, the COGW may send a second control message to the at least one wireless pipe network element through the second interface according to the first control message, where the second control message is used for instructing to configure the wireless network.

Optionally, as another embodiment, before step 520, the COGW may receive an authentication and authorization request message from the capability openness object through the first interface, where the authentication and authorization request message is used for requesting authentication on an identity of the capability openness object. The COGW may send an authentication and authorization response message to the capability openness object through the first interface, where the authentication and authorization response message is used for indicating that the authentication on the identity of the capability openness object succeeds.

Optionally, as another embodiment, the COGW may receive an openable capability query message from the capability openness unit through the first interface, where the openable capability query message is used for requesting an openable capability list, and the openable capability list includes a capability of a wireless pipe network element that can be supplied to the capability openness object. The COGW may send an openable capability response message to the capability openness object through the first interface, where the openable capability response message includes the openable capability list.

Optionally, as another embodiment, the COGW may receive a capability adding request message from the capability openness object through the first interface, where the capability adding request message is used for requesting the COGW to add the capability of the at least one wireless pipe network element into the openable capability list, and the openable capability list includes the capability of the wireless pipe network element that can be supplied to the capability openness object. The COGW may send a capability adding response message to the capability openness object through the first interface, where the capability adding response message is used for indicating that the capability of the at least one wireless pipe network element is successfully added into the openable capability list.

The following describes the embodiment of the present invention in detail with reference to specific examples. It should be understood that, these examples are used only to help a person skilled in the art to better understand the embodiment of the present invention rather than to limit the scope of the embodiment of the present invention.

Figure 6:
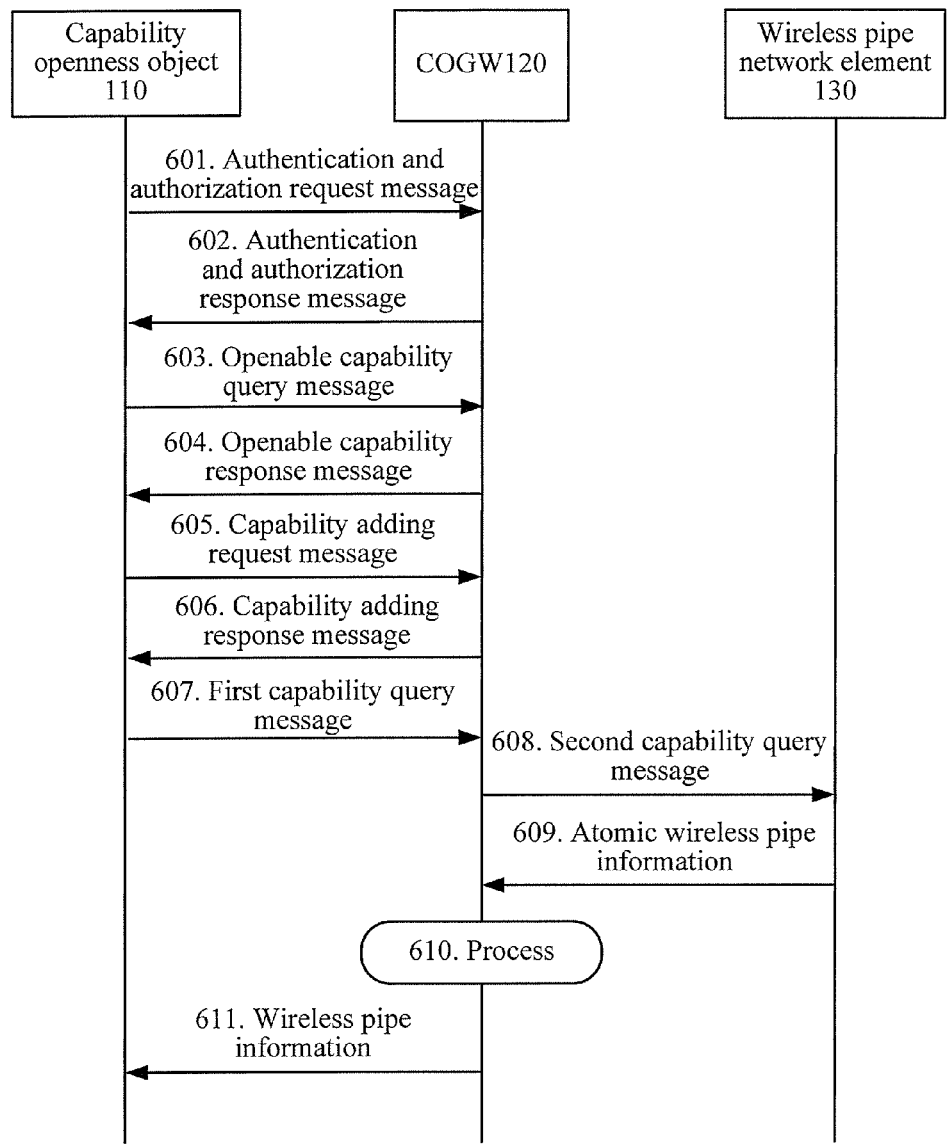
FIG. 6 is a schematic flowchart of a process of a method for opening a wireless pipe capability according to an embodiment of the present invention.

FIG. 6 is a schematic flowchart of a process of a method for opening a wireless pipe capability according to an embodiment of the present invention. In FIG. 6, description is given with reference to the system 100 shown in FIG. 1.

601. A capability openness object 110 sends an authentication and authorization request message to a COGW 120, where the authentication and authorization request message is used for requesting authentication on an identity of the capability openness object 110.

Before using a capability of a wireless pipe network element 130, the capability openness object 110 needs to pass the authentication of the COGW 120.

For example, the authentication and authorization request message may include the identity and a key of the capability openness object 110. For example, in an authentication and authorization manner using a user name/password, the authentication and authorization request message may include a user and a password of the capability openness object 110.

602. The COGW 120 sends an authentication and authorization response message to the capability openness object 110.

For example, the COGW 120 may authenticate the identity and the key of the capability openness object 110 that are carried in the authentication and authorization request message. After the authentication succeeds, the COGW 120 may authorize, by using the authentication and authorization response message, the capability openness object 110 to use the capability of the wireless pipe network element 130, and may generate a use record of the capability openness object 110 and perform charging.

603. The capability openness object 110 sends an openable capability query message to the COGW 120, where the openable capability query message is used for requesting an openable capability list.

The openable capability list may include a capability of a wireless pipe network element that can be supplied to the capability openness object 110. The capability openness object 110 may learn about, by using the openable capability list, a capability of the wireless pipe network element that can be used, so as to better use the capability of the wireless pipe network element.

604. The COGW 120 sends the openable capability response message to the capability openness object 110, where the openable capability response message includes the openable capability list.

605. The capability openness object 110 sends a capability adding request message to the COGW 120, where the capability adding request message is used for requesting the COGW 120 to add the capability of the wireless pipe network element into the openable capability list.

For example, the capability openness object 110 expects to use a capability of a wireless pipe network element but this capability is not in the openable capability list; in this case, the capability openness object 110 may request, by using the capability adding request message, adding of this capability.

606. The COGW 120 sends a capability adding response message to the capability openness object 110, where the capability adding response message is used for indicating that the capability of the wireless pipe network element is successfully added into the openable capability list.

The COGW 120 may add the capability of the wireless pipe network element into the openable capability list according to a demand of the capability openness object 110.

It should be understood that, herein, step 603 to step 606 are optional steps, and may be selectively performed as required.

607. The capability openness object 110 sends a first capability query message to the COGW 120, where the first capability query message is used for requesting wireless pipe information.

608. The COGW 120 sends a second capability query message to the wireless pipe network element 130 according to the first capability query message, where the second capability query message is used for requesting atomic wireless pipe information.

609. The wireless pipe network element 130 sends the atomic wireless pipe information to the COGW 120 according to the second capability query message.

610. The COGW 120 processes the atomic wireless pipe information to obtain the wireless pipe information.

The COGW may process the atomic wireless pipe information to obtain the wireless pipe information. For example, if the atomic wireless pipe information is the wireless pipe information requested by the capability openness object, the COGW 120 may perform transparent transmission processing. It should be understood that, the transparent transmission processing herein may refer to a process that needs to be performed for transparent transmission, rather than substantial processing on the information. If the atomic wireless pipe information is atomic information for obtaining the wireless pipe information, the COGW 120 may perform related processing on the atomic wireless pipe information, such as summarization processing or anonymization processing, so as to obtain the wireless pipe information.

611. The COGW 120 sends the wireless pipe information to the capability openness object 110.

It should be understood that, the sequence numbers of the foregoing processes do not indicate execution sequences, and the execution sequences of the processes should be determined by functions and internal logic of the processes, and shall not constitute any limitation to the implementation process of the embodiment of the present invention.

In the embodiment of the present invention, a COGW obtains atomic wireless pipe information from a wireless pipe network element, and processes the atomic wireless pipe information to obtain wireless pipe information, so that a capability openness object can obtain the wireless pipe information from the COGW, thereby implementing openness of the wireless pipe information.

In addition, the capability openness object can improve quality of service based on the opened wireless pipe information, and can also bring diversified experience to a user.

Figure 7:
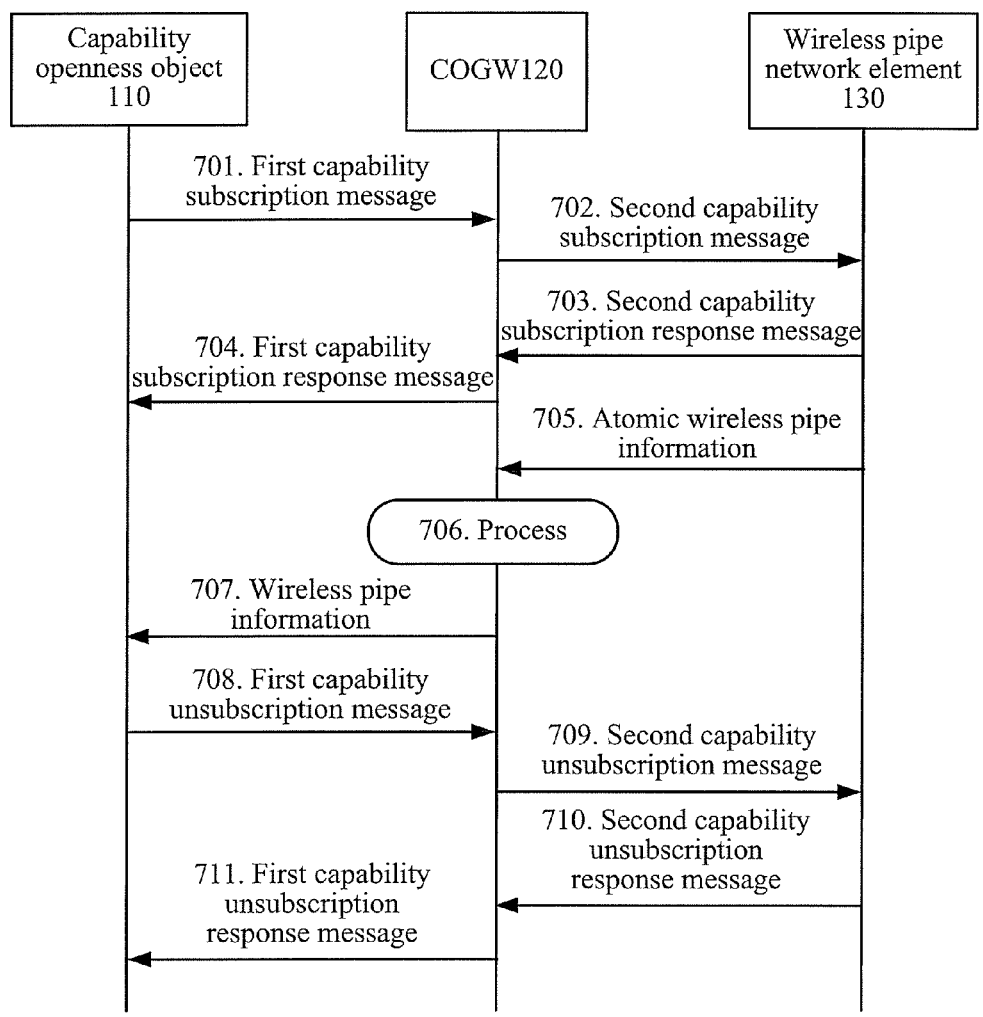
FIG. 7 is a schematic flowchart of a process of a method for opening a wireless pipe capability according to an embodiment of the present invention.

FIG. 7 is a schematic flowchart of a process of a method for opening a wireless pipe capability according to an embodiment of the present invention. In FIG. 7, description is given with reference to the system 100 shown in FIG. 1.

701. A capability openness object sends a first capability subscription message to a COGW 120, where the first capability subscription message is used for instructing the COGW 120 to report wireless pipe information within a subscription time.

For example, the first capability subscription message may include the subscription time, an identifier or a type of subscribed information, and the like.

702. After receiving the first capability subscription message, the COGW 120 sends a second capability subscription message to a wireless pipe network element 130, where the second capability subscription message is used for instructing the wireless pipe network element 130 to report atomic wireless pipe information within the subscription time.

For example, the second capability subscription message may include the subscription time, an identifier or a type of subscribed information, and the like.

703. After receiving the second capability subscription message, the wireless pipe network element 130 completes subscription setting, and sends a second capability subscription response message to the COGW 120, where the second capability subscription response message is used for indicating that the atomic wireless pipe information is successfully subscribed to.

704. After receiving the second capability subscription response message, the COGW 120 sends a first capability subscription response message to the capability openness object 110, where the first capability subscription response message is used for indicating that the wireless pipe information is successfully subscribed to.

705. After detecting the subscribed atomic wireless pipe information within the subscription time, the wireless pipe network element 130 sends the atomic wireless pipe information to the COGW 120.

For example, the wireless pipe network element 130 may send the atomic wireless pipe information to the COGW 120 periodically or aperiodically within the subscription time.

706. The COGW 120 processes the atomic wireless pipe information to obtain the wireless pipe information.

707. The COGW 120 sends the wireless pipe information to the capability openness object 110.

For example, the COGW 120 may send the wireless pipe information to the capability openness object 110 periodically or aperiodically within the subscription time.

708. The capability openness object 110 sends a first capability unsubscription message to the COGW 120, where the first capability unsubscription message is used for instructing the COGW 120 to stop reporting the wireless pipe information.

For example, when the capability openness object 110 no longer needs the wireless pipe information, the capability openness object 110 may send the first capability unsubscription message to the COGW 120.

709. After receiving the first capability unsubscription message, the COGW 120 sends a second capability unsubscription message to the wireless pipe network element 130, where the second capability unsubscription message is used for instructing the wireless pipe network element 130 to stop reporting the atomic wireless pipe information.

710. After receiving the second capability unsubscription message, the wireless pipe network element 130 completes unsubscription settings, and sends a second capability unsubscription response message to the COGW 120, where the second capability unsubscription response message is used for indicating that unsubscription is completed.

711. After receiving the second capability unsubscription response message, the COGW 120 completes unsubscription setting, and sends a first capability unsubscription response message to the capability openness object 110, where the first capability unsubscription response message is used for indicating that unsubscription is completed.

It should be understood that, the sequence numbers of the foregoing processes do not indicate execution sequences, and the execution sequences of the processes should be determined by functions and internal logic of the processes, and shall not constitute any limitation to the implementation process of the embodiment of the present invention.

In addition, although step 601 to step 606 in FIG. 6 are not shown in the procedure in FIG. 7, step 601 to step 606 in FIG. 6 may also be selectively performed in the procedure in FIG. 7.

In the embodiment of the present invention, a capability openness object subscribes to wireless pipe information from a COGW in a subscription manner, and the COGW subscribes to atomic wireless pipe information from a wireless pipe network element in a subscription manner, so that the capability openness object can continuously obtain the wireless pipe information within a subscription time; therefore, the capability openness object can improve quality of service based on the opened wireless pipe information, and can also bring diversified experience to a user.

Figure 8:
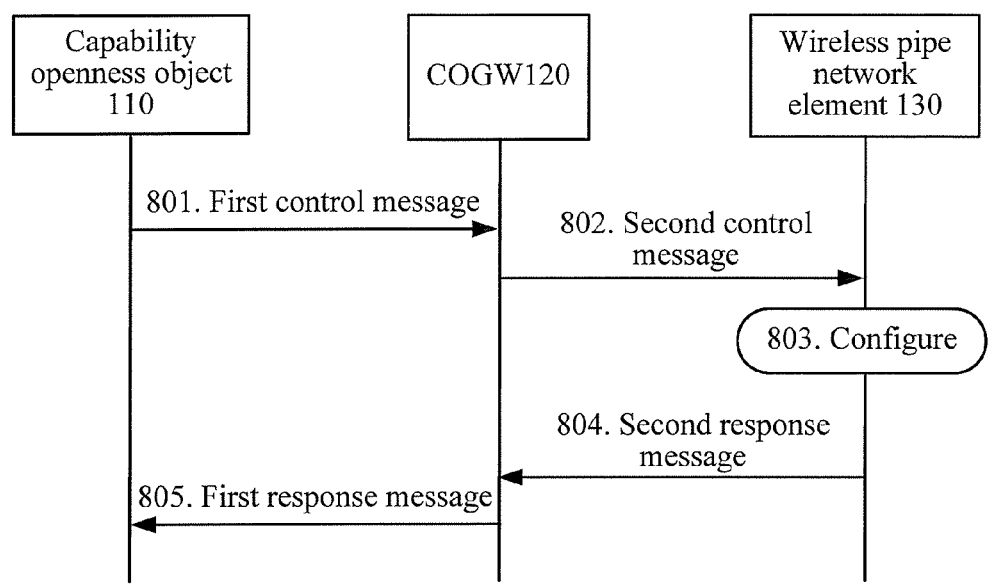
FIG. 8 is a schematic flowchart of a process of a method for opening a wireless pipe capability according to an embodiment of the present invention.

FIG. 8 is a schematic flowchart of a process of a method for opening a wireless pipe capability according to an embodiment of the present invention. In FIG. 8, description is given with reference to the system 100 shown in FIG. 1.

801. A capability openness object 110 sends a first control message to a COGW 120, where the first control message is used for instructing the COGW to configure a wireless network.

For example, the configuration on the wireless network may include setting of a related parameter and the like of a wireless network, for example, modification of a quality of service (Quality of Service, OoS) parameter, and setting of a list of uniform resource locators (Uniform Resource Locator, URL) accessible to the UE. The configuration on the wireless network may further include resource configuration on the wireless network, for example, configuration on a virtual hardware resource in the wireless network, and configuration on a central processing unit (Central Processing Unit, CPU) resource or storage resource.

802. The COGW 120 sends a second control message to a wireless pipe network element 130, where the second control message is used for instructing to configure the wireless network.

803. The wireless pipe network element 130 configures the wireless network according to the second control message.

For example, a parameter of the wireless network is modified, or virtual hardware resource of the wireless network is configured.

804. After completing configuration on the wireless network, the wireless pipe network element 130 sends a second response message to the COGW 120, where the second response message is used for indicating that the configuration on the wireless network is completed.

805. After receiving the second response message from the wireless pipe network element 130, the COGW 120 sends a first response message to the capability openness object, where the first response message is used for indicating that the configuration on the wireless network is completed.

In addition, although steps 601 to 606 in FIG. 6 are not shown in the procedure in FIG. 8, steps 601 to 606 in FIG. 6 may also be selectively performed in the procedure in FIG. 8.

In the embodiment of the present invention, a capability openness object instructs, by using a first control message, a COGW to configure a wireless network, and the COGW instructs, by using a second control message, a wireless pipe network element to configure the wireless network, thereby implementing openness of a wireless pipe control capability; therefore, the capability openness object can improve quality of service based on the opened wireless pipe control capability, and can also bring diversified experience to a user.

The following describes the method for opening a wireless pipe network element in the embodiment of the present invention in detail with reference to specific examples.

Figure 9A:
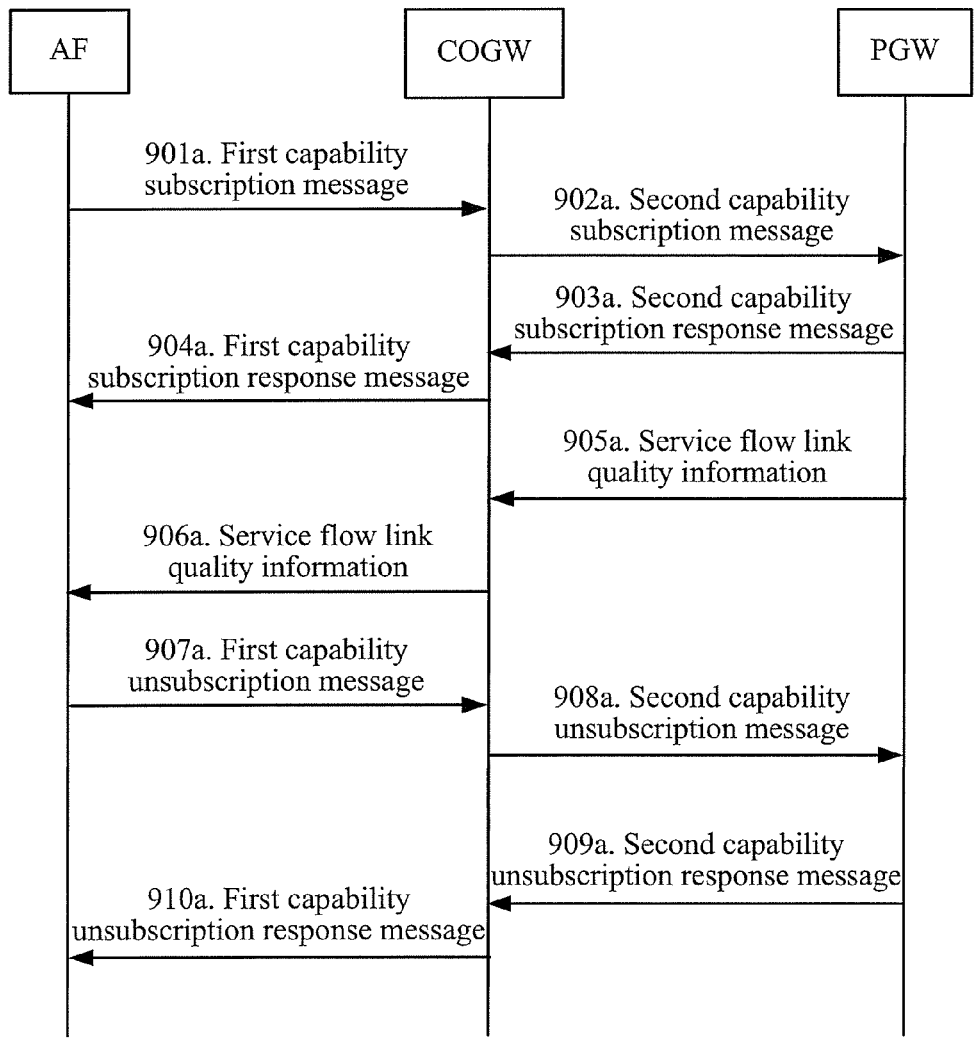
FIG. 9a is a schematic flowchart of a process of a method for opening a wireless pipe capability according to an embodiment of the present invention.

FIG. 9*a* is a schematic flowchart of a process of a method for opening a wireless pipe capability according to an embodiment of the present invention. In FIG. 9*a*, it is assumed that a capability openness object is an AF device, and the AF device needs to obtain service flow link quality information of a specified UE, where the information belongs to service flow level information. Herein, a wireless pipe network element may be a PGW.

901a. The AF device sends a first capability subscription message to a COGW, where the first capability subscription message is used for instructing to report the service flow link quality information within a subscription time.

For example, the first capability subscription message may carry a UE identifier (Identifier, ID) and an information identifier, where the information identifier may be used for indicating that which type of information is to be obtained, for example, the information identifier herein may indicate the service flow link quality information.

902a. The COGW sends a second capability subscription message to the PGW, where the second capability subscription message is used for instructing to stop reporting the service flow link quality information within the subscription time.

For example, the second capability subscription message may carry the UE ID and the information identifier, where the information identifier may indicate the service flow link quality information.

903a. After completing subscription settings, the PGW sends a second capability subscription response message to the COGW, where the second capability subscription response message is used for indicating that the service flow link quality information is successfully subscribed to.

For example, the second capability subscription response message may carry the UE ID, the information identifier, and a subscription result, where the subscription result may indicate whether corresponding information is successfully subscribed to.

904a. After receiving the second capability subscription response message, the COGW sends a first capability subscription response message to the AF device, where the first capability subscription response message is used for indicating that the service flow link quality information is successfully subscribed to.

For example, the first capability subscription response message may carry the UE ID, the information identifier, and the subscription result, where the subscription result may indicate whether the corresponding information is successfully subscribed to.

905a. After detecting the service flow link quality information, the PGW sends the service flow link quality information to the COGW.

906a. The COGW sends the service flow link quality information to the AF device.

907a. The AF device sends a first capability unsubscription message to the COGW, where the first capability unsubscription message is used for instructing the COGW to stop reporting the service flow link quality information.

For example, when the AF device no longer needs the service flow link quality information, the AF device may unsubscribe from the information by using the first capability unsubscription message.

The first capability unsubscription message may carry the UE ID and the information identifier.

908a. After receiving the first capability unsubscription message, the COGW sends a second capability unsubscription message to the PGW, where the second capability unsubscription message is used for instructing the PGW to stop reporting the service flow link quality information.

909a. After receiving the second capability unsubscription message, the PGW completes unsubscription settings, and sends a second capability unsubscription response message to the COGW, where the second capability unsubscription response message is used for indicating that unsubscription is completed.

910a. After receiving the second capability unsubscription response message, the COGW completes unsubscription settings, and sends a first capability unsubscription response message to the AF device, where the first capability unsubscription response message is used for indicating that unsubscription is completed.

In the embodiment of the present invention, an AF device subscribes to service flow link quality information from a COGW in a subscription manner, and the COGW subscribes to the service flow link quality information from a PGW in a subscription manner, so that the AF device can continuously obtain the service flow link quality information within a subscription time; therefore, the AF device can improve quality of service based on the opened service flow link quality information, and can also bring diversified experience to a user.

Figure 9B:
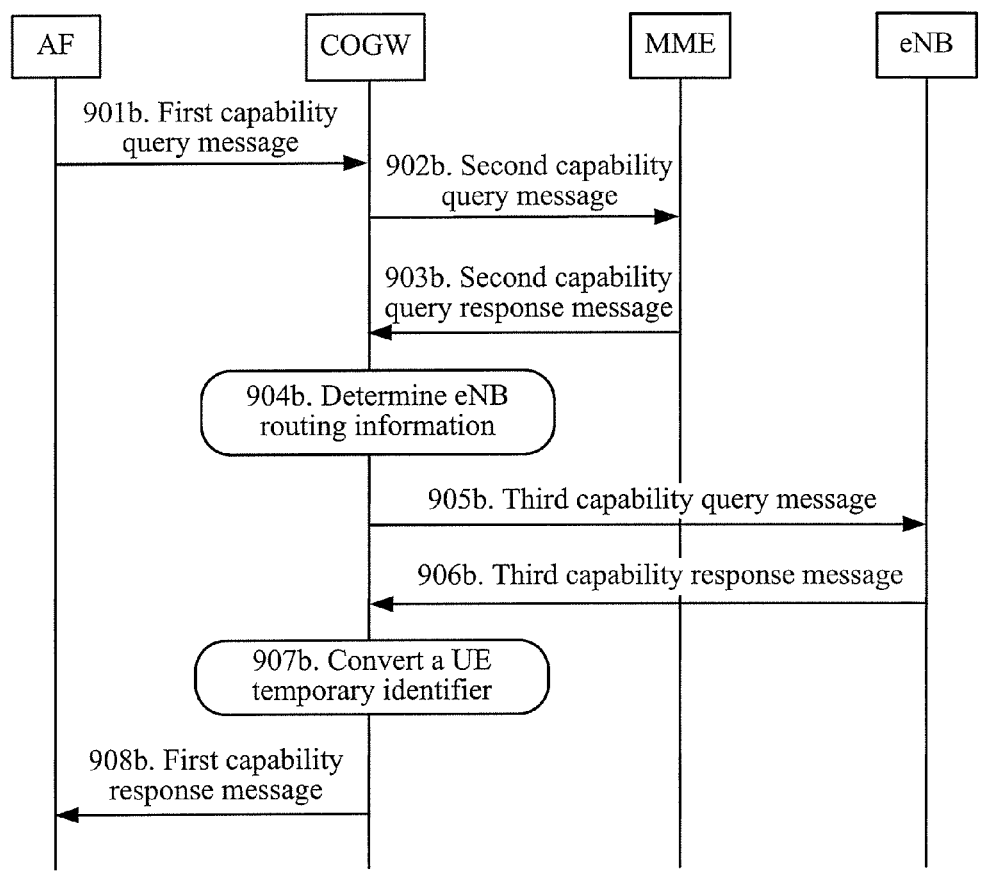
FIG. 9b is a schematic flowchart of a process of a method for opening a wireless pipe capability according to another embodiment of the present invention.

FIG. 9b is a schematic flowchart of a process of a method for opening a wireless pipe capability according to another embodiment of the present invention. In FIG. 9b, it is assumed that a capability openness object is an AF device, and the AF device needs to obtain signal quality information of a specified UE, where the information belongs to user level information. Herein, a wireless pipe network element may be an MME and an eNB.

901b. The AF device sends a first capability query message to a COGW, where the first capability query message is used for requesting the signal quality information of the UE.

For example, the first capability query message may carry a UE ID and an information identifier, where the information identifier may be used for indicating the signal quality information.

902b. After receiving the first capability query message, the COGW sends a second capability query message to the MME, where the second capability query message is used for requesting information of a cell in which the UE is located.

For example, the second capability query message may carry the UE ID.

903b. The MME sends a second capability query response message to the COGW, where the second capability query response message carries the information of the cell in which the UE is located and a UE temporary identifier in the eNB.

904b. The COGW determines, according to the received information of the cell in which the UE is located, eNB routing information corresponding to the cell in which the UE is located.

For example, the eNB routing information may be an IP address of the eNB, and an eNB currently serving the UE may be determined according to the eNB routing information.

905b. The COGW sends a third capability query message to the eNB indicated by the eNB routing information, where the third capability query message is used for requesting the signal quality information of the UE.

For example, the third capability query information may carry the UE temporary identifier received from the MME and an information identifier, where the information identifier may be used for indicating the signal quality information.

906b. After receiving the third capability query message, the eNB sends the signal quality information of the UE to the COGW.

907b. After receiving the signal quality information of the UE, the COGW converts the UE temporary identifier into the UE ID.

For example, the UE temporary identifier is converted into an international mobile subscriber identity (International Mobile Subscriber Identification Number, IMSI) or a mobile station international integrated services digital network number (Mobile Station International Integrated Service Digital Network Number, MSISDN).

908b. The COGW sends a first capability response message to the AF device, where the first capability response message carries the UE ID and the signal quality information of the UE.

In the embodiment of the present invention, an AF device obtains signal quality information of a specified UE from a COGW, so that the quality of service can be improved based on the opened signal quality information of the UE, and diversified experience can also be brought to a user.

Figure 9C:
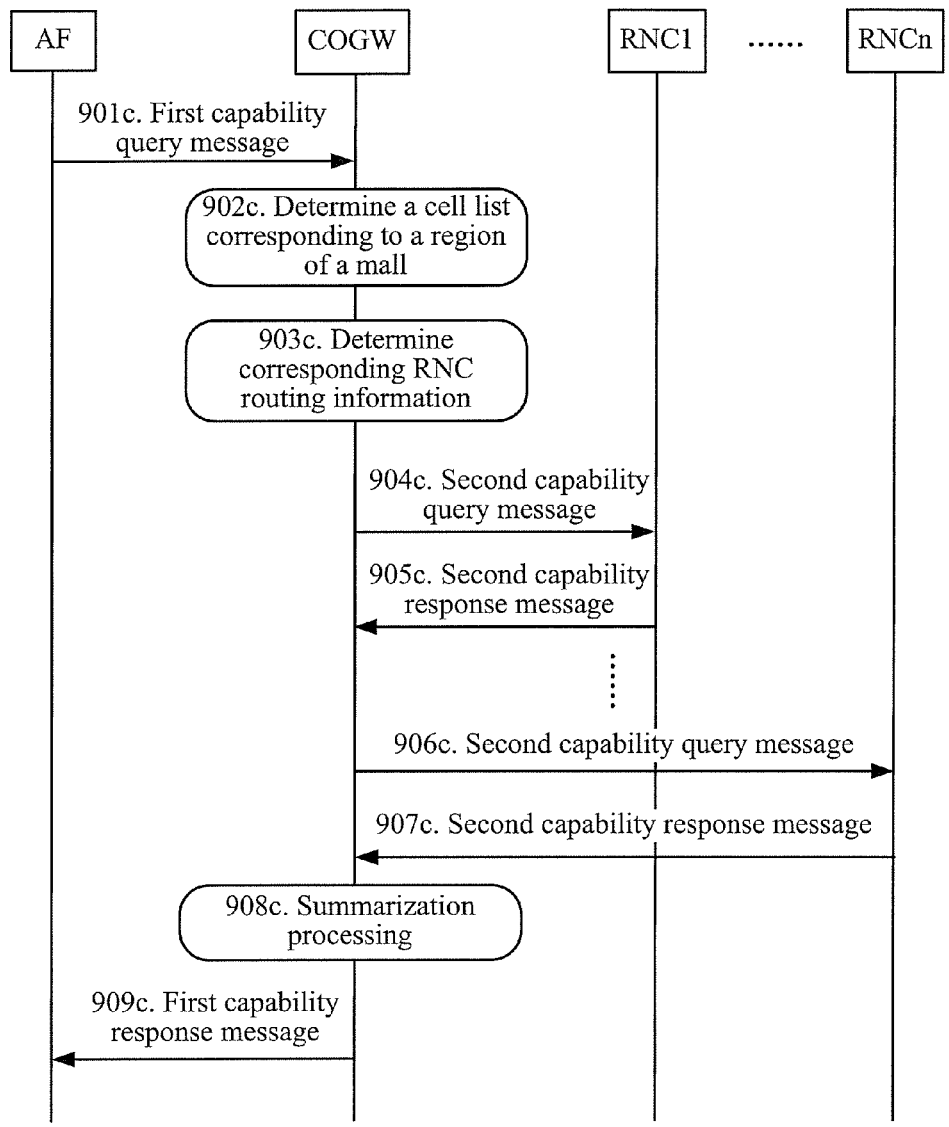
FIG. 9c is a schematic flowchart of a process of a method for opening a wireless pipe capability according to another embodiment of the present invention.

FIG. 9c is a schematic flowchart of a process of a method for opening a wireless pipe capability according to another embodiment of the present invention. In FIG. 9c, it is assumed that a capability openness object is an AF device, and the AF device needs to obtain information of all online UEs in a specified mall, where the information belongs to cell level information. Herein, a wireless pipe network element may be an RNC.

901c. The AF device sends a first capability query message to a COGW, where the first capability query message is used for requesting information of all online UEs in a cell corresponding to the mall.

For example, the first capability query message may carry a mall name and an information identifier, where the information identifier may be used for indicating the information of all the online UEs in a cell.

902c. The COGW determines, according to the mall name, a cell list corresponding to a region of the mall.

903c. The COGW determines, according to the cell list, RNC routing information corresponding to cells respectively.

For example, the RNC routing information may be an IP address of the RNC, or the like, and an RNC corresponding to each cell may be determined according to the RNC routing information.

It is assumed that the cells herein correspond to n RNCs respectively, and these n RNCs are numbered RNC1 to RNCn.

Therefore, the COGW may send a second capability query message to each of these n RNCs respectively, where the second capability query message is used for requesting information of all online UEs in a cell in the these n RNCs.

The second capability query message may carry a cell identifier and an information identifier, where the information identifier may indicate the information of all the online UEs.

It should be understood that, for ease of description, FIG. 9c only shows the process in which the COGW sends the second capability query message to the RNC1 and the RNCn, and the interaction processes between the COGW and other RNCs are omitted.

For example, in 904c, the COGW sends the second capability query message to the first RNC, that is, the RNC1, where the second capability query message is used for requesting information of all online UEs in a cell corresponding to the RNC1.

905c. After receiving the second capability query message, the RNC1 sends a second capability response message to the COGW, where the second capability response message carries the information of all the online UEs in the cell corresponding to the RNC1.

906c. The COGW sends the second capability query message to the $n^{th}$ RNC, that is, the RNCn, where the second capability query message is used for requesting information of all online UEs in a cell corresponding to the RNCn.

907c. The RNCn sends a second capability response message to the COGW, where the second capability response message carries the information of all the online UEs in the cell corresponding to the RNCn.

908c. After receiving information of all online UEs in each cell returned by the n RNCs separately, the COGW performs summarization processing on the information of all the online UEs in each cell, so as to obtain the information of all the online UEs in the mall.

909c. The COGW sends a first capability response message to the AF device, where the first capability response message carries the information of all the online UEs in the mall.

In the embodiment of the present invention, an AF device obtains information of all online UEs in a specified region from a COGW, so that quality of service can be improved based on the opened information of all the online UEs, and diversified experience can also be brought to a user.

Figure 9D:
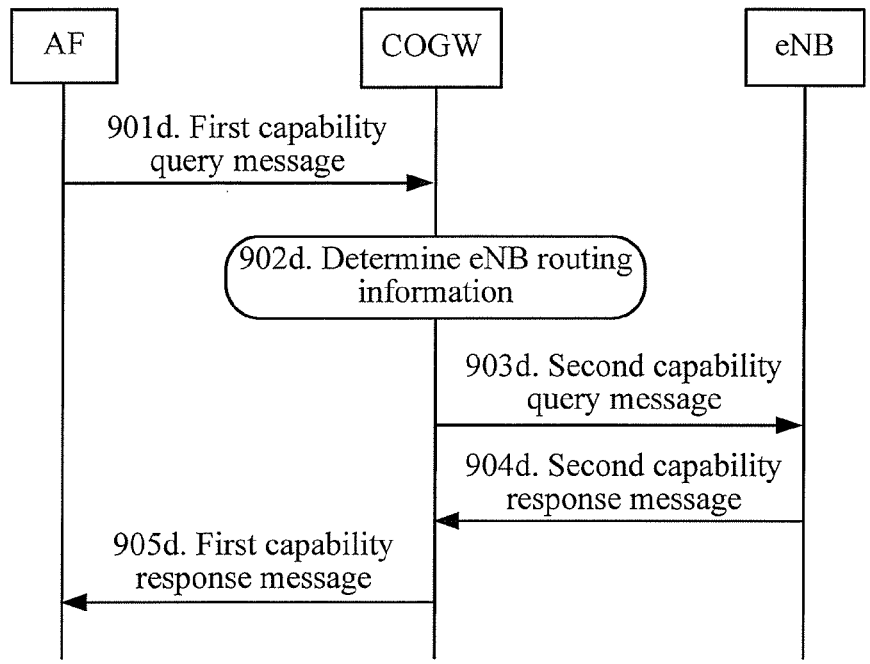
FIG. 9d is a schematic flowchart of a process of a method for opening a wireless pipe capability according to another embodiment of the present invention.

FIG. 9d is a schematic flowchart of a process of a method for opening a wireless pipe capability according to another embodiment of the present invention. In FIG. 9d, it is assumed that a capability openness object is an AF device, and the AF device needs to obtain transmission resource (Backhaul) usage information of a specified base station, where the information belongs to base station level information. Herein, a wireless pipe network element may be an eNB.

901d. The AF device sends a first capability query message to a COGW, where the first capability query message is used for requesting transmission resource usage information of an eNB.

For example, the first capability query message may carry an eNB ID and an information identifier, where the information identifier may be used for indicating the transmission resource usage information.

902d. The COGW determines corresponding eNB routing information according to the eNB ID.

The eNB routing information may be an IP address of the eNB, and a corresponding eNB may be determined according to the eNB routing information.

903d. The COGW sends a second capability query message to the eNB indicated by the eNB routing information, where the second capability query message is used for requesting the transmission resource usage information of the eNB.

904d. The eNB sends a second capability response message to the COGW, where the second capability response message carries the transmission resource usage information.

905d. The COGW sends a first capability response message to the AF device, where the first capability response message carries the eNB ID and the transmission resource usage information of the eNB.

In the embodiment of the present invention, an AF device obtains transmission resource usage information of an eNB from a COGW, so that the quality of service can be improved based on the opened transmission resource usage information of the eNB, and diversified experience can also be brought to a user.

Figure 9E:
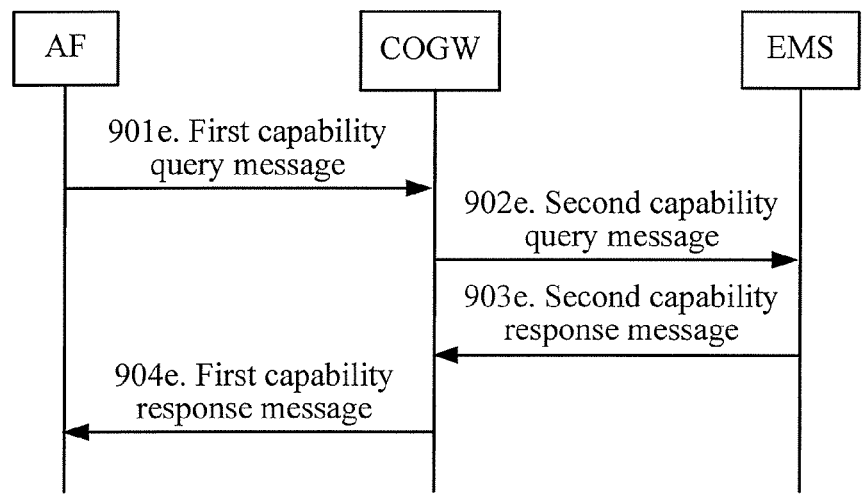
FIG. 9e is a schematic flowchart of a process of a method for opening a wireless pipe capability according to another embodiment of the present invention.

FIG. 9e is a schematic flowchart of a process of a method for opening a wireless pipe capability according to another embodiment of the present invention. In FIG. 9e, it is assumed that a capability openness object is an AF device, and the AF device needs to obtain information about an entire-network data transmission busy hour and a corresponding throughput, where the information belongs to system level information. Herein, a wireless pipe network element may be an EMS.

901e. The AF device sends a first capability query message to a COGW, where the first capability query message is used for requesting the entire-network data transmission busy hour and the corresponding throughput.

902e. After receiving the first capability query message, the COGW sends a second capability query message to the EMS, where the second capability query message is used for requesting the entire-network data transmission busy hour and the corresponding throughput.

903e. The EMS sends a second capability response message to the COGW, where the second capability response message carries the entire-network data transmission busy hour and the corresponding throughput.

904e. The COGW sends a first capability response message to the AF device, where the first capability response message carries the entire-network data transmission busy hour and the corresponding throughput.

In the embodiment of the present invention, an AF device obtains an entire-network data transmission busy hour and a corresponding throughput from a COGW, so that the quality of service can be improved based on the opened entire-network data transmission busy hour and corresponding throughput, and diversified experience can also be brought to a user.

Figure 9F:
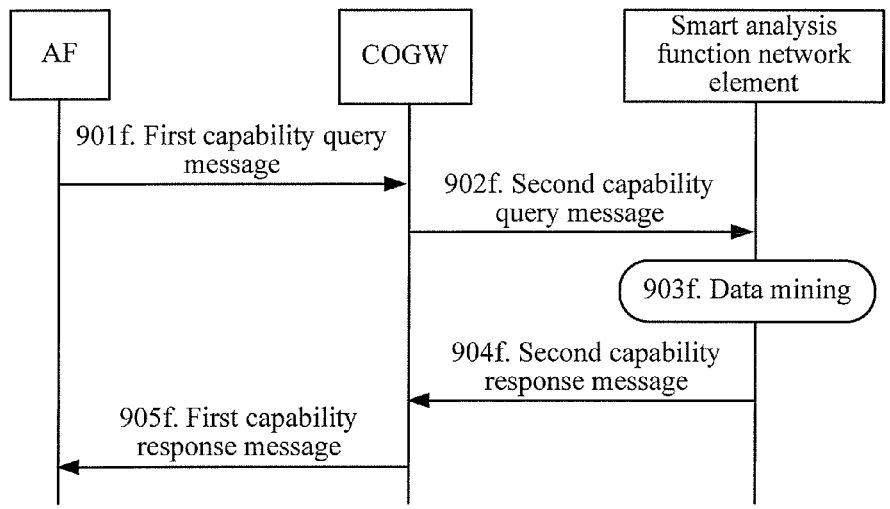
FIG. 9f is a schematic flowchart of a process of a method for opening a wireless pipe capability according to another embodiment of the present invention.

FIG. 9f is a schematic flowchart of a process of a method for opening a wireless pipe capability according to another embodiment of the present invention. In FIG. 9f, it is assumed that a capability openness object is an AF device, and the AF device needs to obtain information of a user that generates the largest volume of traffic in accessing a specified URL in a previous month, where the information belongs to system level information. Herein, a wireless pipe network element may be a smart analysis function network element. For example, smartiew, smartcare, or the like that is provided by some suppliers belongs to a smart analysis function network element.

901f. The AF sends a first capability query message to a COGW, where the first capability query message is used for requesting information of a user that generates the largest volume of traffic in accessing a specified URL.

For example, the first capability query message may carry a URL and an information identifier, where the information identifier may indicate the information of the user that generates the largest volume of traffic in accessing the specified URL.

902f. After receiving the first capability query message, the COGW sends a second capability query message to the smart analysis function network element, where the second capability query message is used for requesting the information of the user that generates the largest volume of traffic in accessing the specified URL.

For example, the second capability query message may carry the URL and the information identifier, where the information identifier may indicate the information of the user that generates the largest volume of traffic in accessing the specified URL.

903f. After receiving the second capability query message, the smart analysis function network element determines, through big data mining analysis, the information of the user that generates the largest volume of traffic in accessing the specified URL.

904f. The smart analysis function network element sends a second capability response message to the COGW, where the second capability response message carries the information of the user that generates the largest volume of traffic in accessing the specified URL.

905f. The COGW sends a first capability response message to the AF device, where the first capability response message carries the information of the user that generates the largest volume of traffic in accessing the specified URL.

It should be understood that, in the embodiment of the present invention, a big data mining module may also be added into the COGW, where the module is configured to perform big data mining.

In the embodiment of the present invention, an AF device obtains, from a COGW, information of a user that generates the largest volume of traffic in accessing a specified URL within a specified period of time, so that the quality of service can be improved based on the opened information, and diversified experience can also be brought to a user.

Figure 9G:
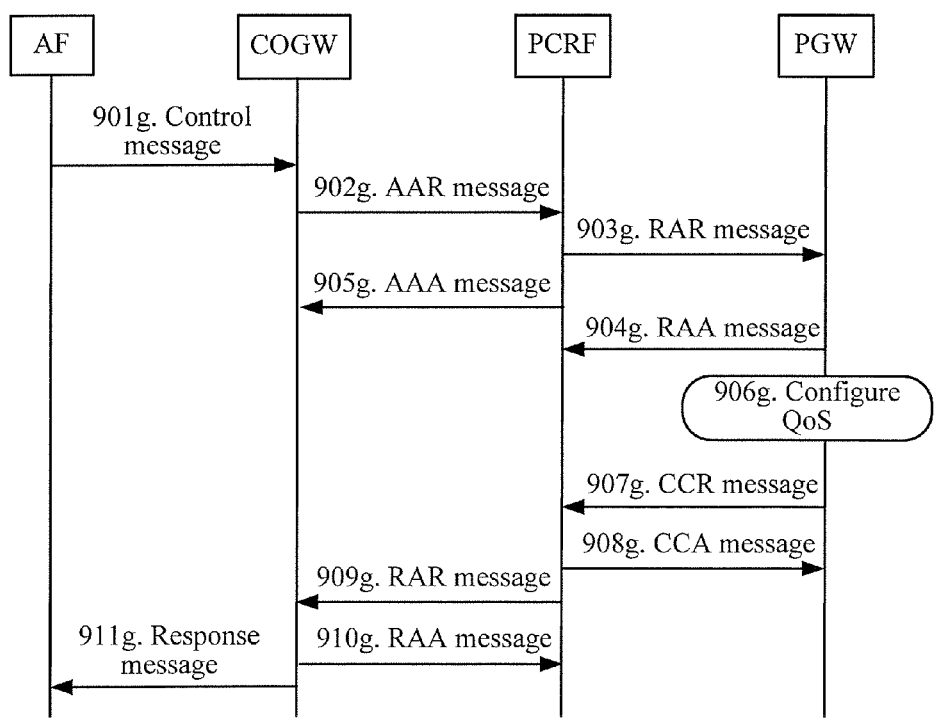
FIG. 9g is a schematic flowchart of a process of a method for opening a wireless pipe capability according to another embodiment of the present invention.

FIG. 9g is a schematic flowchart of a process of a method for opening a wireless pipe capability according to another embodiment of the present invention. In FIG. 9g, it is assumed that a capability openness object is an AF device, and the AF device expects to raise a bandwidth guarantee priority for a specified user to access a specified URL, and therefore needs to modify a QoS parameter of a corresponding bearer. Such configuration on a wireless network belongs to system level configuration. Herein, a wireless pipe network element may be a PCRF and a PGW.

901g. The AF device sends a control message to a COGW, where the control message is used for instructing to configure a QoS parameter of a specified bearer.

For example, the control message may carry an application ID, flow information, QoS information, and an AF charging identifier.

902g. The COGW sends an authentication and authorization request (Authorization and Authentication Request, AAR) message to the PCRF, where the AAR message is used for requesting control on the QoS from the PCRF.

For example, the AAR message may carry information such as the application ID, the AF charging identifier, and a QoS configuration rule, where the QoS configuration rule may include configuration on a QoS parameter when an event that a specified user accesses a specified URL occurs.

903g. The PCRF sends a re-authentication/authorization request (Re-Auth-Request, RAR) message to the PGW, where the RAR message is used for requesting control on the QoS from the PGW.

For example, the RAR message may carry information such as the AF charging identifier and the QoS configuration rule.

904g. The PGW stores information such as the QoS configuration rule and then sends a re-authentication/authorization answer (Re-Auth-Answer, RAA) message to the PCRF, where the RAA message is used for indicating that the request for control on the QoS succeeds.

905g. The PCRF sends an authentication and authorization answer (Authorization and Authentication Answer, AAA) message to the COGW, where the AAA message is used for indicating that the request for control on the QoS succeeds.

906g. After detecting a flow that meets the OoS configuration rule, the PGW configures the QoS parameter for the flow.

907g. The PGW sends a credit control request (Credit-Control-Request, CCR) message to the PCRF, where the CCR message is used for indicating that the configuration on the QoS parameter is completed.

908g. The PCRF sends a credit control answer (Credit-Control-Answer, CCA) message to the PGW, where the CCA message is used for indicating that the CCR message is received.

909g. The PCRF sends the RAR message to the COGW, where the RAR message is used for indicating that the configuration on the QoS parameter is completed.

910g. The COGW sends the RAA message to the PCRF.

911g. The COGW sends a response message to the AF device, where the response message is used for indicating that the configuration on the QoS parameter is completed.

For specific descriptions of the foregoing AAR message, AAA message, RAR message, RAA message, CCR message, and CCA message, reference may be made to the prior art, which are not described herein again.

In the embodiment of the present invention, an AF device modifies a QoS parameter of a service flow by using a capability of controlling a wireless pipe network element supplied by a COGW, so that the quality of service can be improved, and diversified experience can also be brought to a user.

Figure 9H:
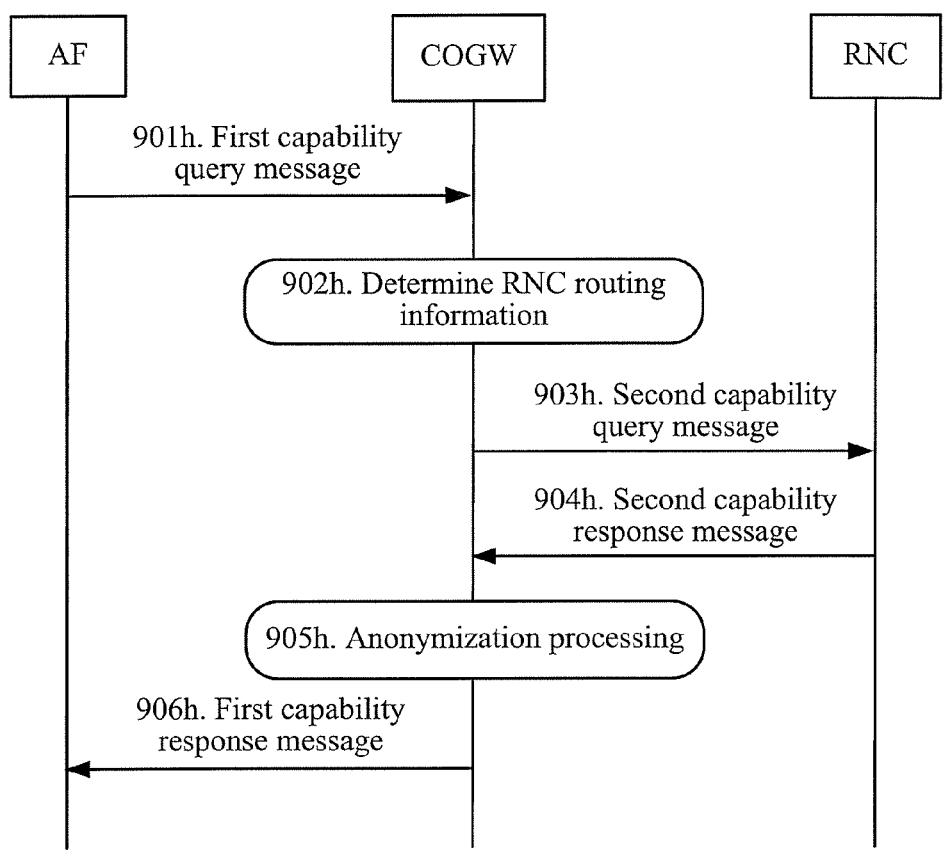
FIG. 9h is a schematic flowchart of a process of a method for opening a wireless pipe capability according to another embodiment of the present invention.

FIG. 9h is a schematic flowchart of a process of a method for opening a wireless pipe capability according to another embodiment of the present invention. In FIG. 9h, it is assumed that a capability openness object is an AF device, and the AF device needs to obtain information of all users in a specified cell. Herein, a wireless pipe network element may be an RNC.

901h. The AF device sends a first capability query message to a COGW, where the first capability query message is used for requesting the information of all the users in the specified cell.

For example, the first capability query message may carry a cell ID and an information identifier, where the information identifier may be used for indicating the information of all the users in the cell.

902h. The COGW determines, according to the cell ID, RNC routing information corresponding to the cell.

For example, the RNC routing information may be an IP address of the RNC, or the like, and an RNC corresponding to the cell may be determined according to the RNC routing information.

903h. The COGW sends a second capability query message to the RNC indicated by the RNC routing information, where the second capability query message is used for requesting the information of all the users in the cell.

904h. The RNC sends the information of all the users in the cell to the COGW.

905h. The COGW performs anonymization processing on privacy information in the information of all the users in the cell, so as to obtain anonymized information of all the users in the cell.

Because user information may involve user privacy, anonymization processing needs to be performed on the user information to prevent invasion of user privacy. The user information herein may include, but is not limited to, a password, a bank account, and personal data. For example, the personal data may be data that can be separately used or combined with other information to identify a living natural person, and for example, may include: an end user name, a mobile terminal IMSI, a user account, a calling number and a called number, a communication record, a call detail record, a communication time or positioning data, and the like.

Therefore, according to the need of protecting user privacy, anonymization processing needs to be performed on the user information. The user information after the anonymization processing can only be restored and identified by the COGW. Various solutions are available for the anonymization processing on the user information, such as a mapping table manner or an encryption manner. A mapping table in the mapping table manner and a key in the encryption manner may be stored in the COGW and cannot be exposed to an AF.

For example, in step 905h, the COGW may perform anonymization processing in the encryption manner. For example, the following encryption algorithms may be used: a data encryption standard (Data Encryption Standard, DES) algorithm, a 3DES algorithm, an RC2 algorithm and an RC4 algorithm, an RSA algorithm, an advanced encryption standard (Advanced Encryption Standard, AES) algorithm, a BLOWFISH algorithm, and the like. In addition, an encryption key may be stored in the COGW.

906h. The COGW sends a first capability response message to the AF device, where the first capability response message carries the anonymized information of all the users in the cell.

In the embodiment of the present invention, anonymization processing on user information can be supported, so that wireless pipe information is opened and protection for user privacy can also be provided.

Figure 9I:
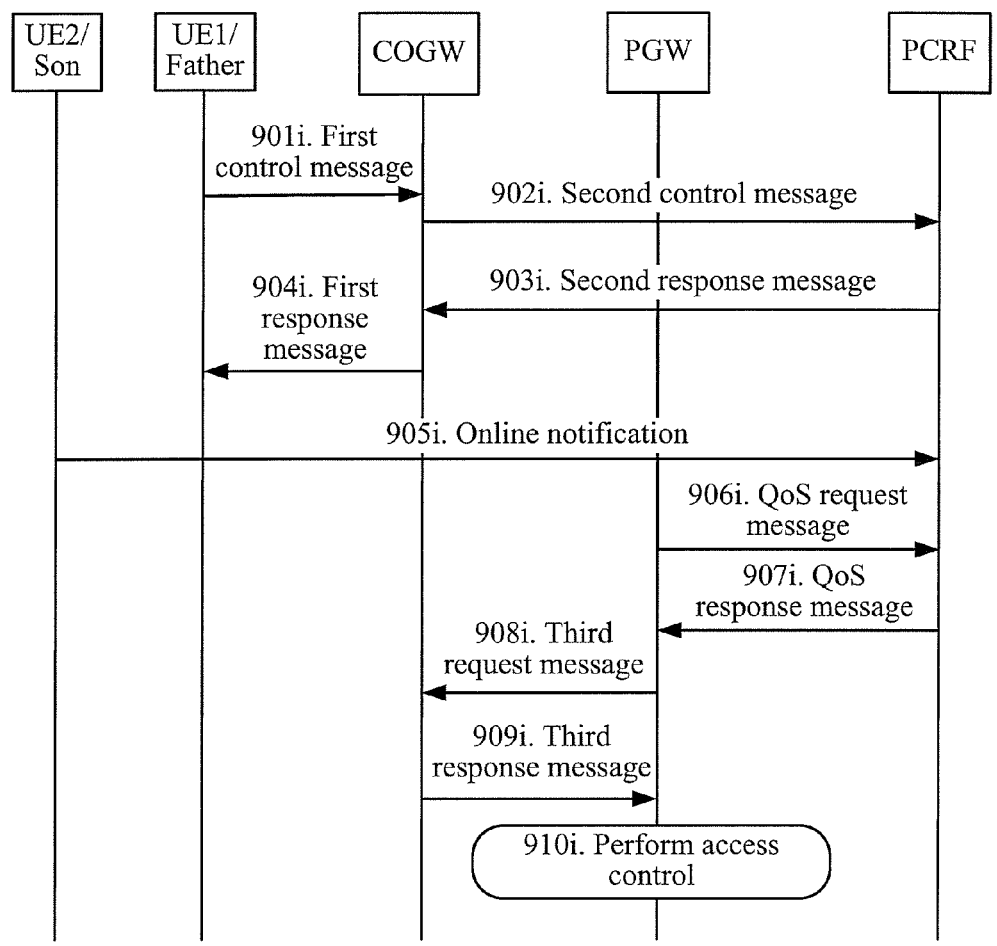
FIG. 9i is a schematic flowchart of a process of a method for opening a wireless pipe capability according to another embodiment of the present invention.

FIG. 9i is a schematic flowchart of a process of a method for opening a wireless pipe capability according to another embodiment of the present invention. In FIG. 9i, it is assumed that a capability openness object is a UE, which is represented by a UE1 in FIG. 9i. The UE1 may request, through a portal interface (Portal) provided by a COGW, control on a list of URLs that a specified UE can access, and herein, the specified UE is represented by a UE2. For example, a father expects to control a list of URLs that a son can access, for example, forbid access to a game website. Such configuration on a wireless network belongs to a system level configuration. Herein, a wireless pipe network element may be a PGW and a PCRF.

901i. The UE1 sends a first control message to the COGW, where the first control message is used for requesting control on a list of URLs for the UE2 to access.

For example, the first control message may carry an ID of the UE2 and a list of URLs forbidden to access.

902i. After receiving the first control message, the COGW sends a second control message to the PCRF, where the second control message is used for requesting control on the list of URLs for the UE2 to access.

903i. The PCRF records the request and then sends a second response message to the COGW, where the second response message is used for indicating that the request succeeds.

904i. The COGW sends a first response message to the UE1, where the first response message is used for indicating that the request succeeds.

905i. When the UE2 gets online, the PGW receives an online notification message of the UE2.

906i. The PGW sends a QoS request message to the PCRF, where the QoS request message is used for requesting QoS information of the UE2.

907i. The PCRF sends a QoS response message to the PGW, where the QoS response message carries the QoS information of the UE2, and the QoS information of the UE2 includes an access control identifier.

The access control identifier may be used for indicating that access of the UE2 is under control.

908i. After receiving the QoS response message, the PGW sends a third request message to the COGW, where the third request message is used for requesting the list of URLs that the UE2 is forbidden to access.

After discovering the access control identifier in the QoS information of the UE2, the PGW may determine that access of the UE2 is under control, and therefore may request, from the COGW, the list of URLs that the UE2 is forbidden to access. For example, the third request message may further carry an online time of the UE2 and the ID of the UE2.

909i. The COGW sends a third response message to the POW, where the third response message carries the list of URLs that the UE2 is forbidden to access and the ID of the UE2.

910i. After receiving the third response message, the PGW performs access control on the UE2 according to the list of URLs that the UE2 is forbidden to access.

The embodiment of the present invention is directly oriented to a user, so that the user can implement configuration on a wireless network by using, through a portal interface provided by a COGW, a capability of controlling a wireless pipe network element, so that the user experience can be improved.

Figure 9J:
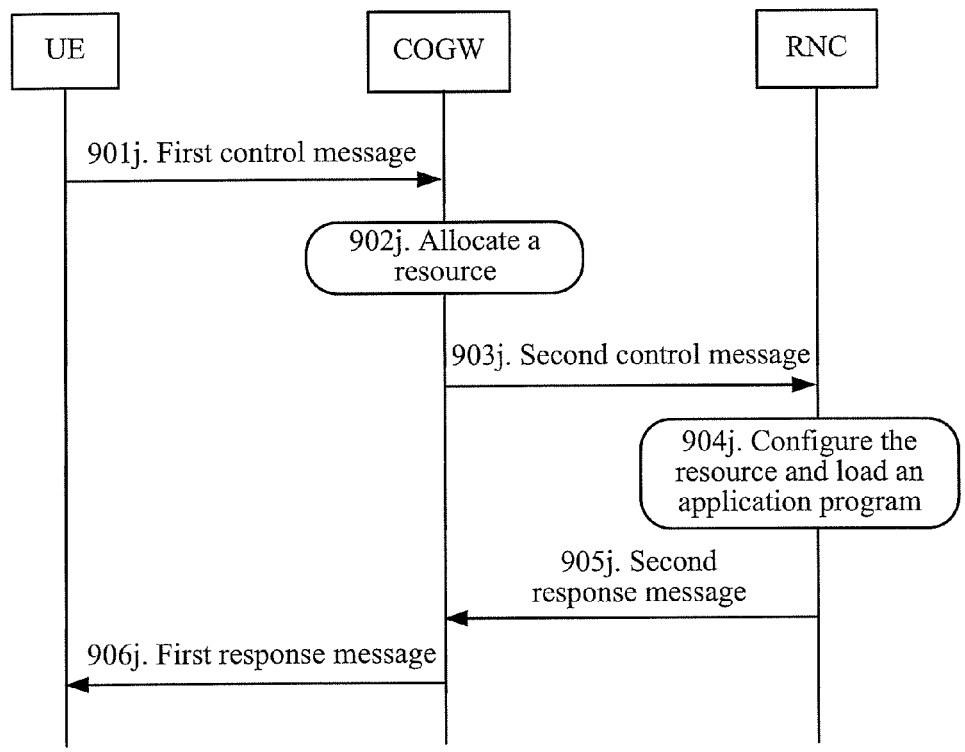
FIG. 9j is a schematic flowchart of a process of a method for opening a wireless pipe capability according to another embodiment of the present invention.

FIG. 9j is a schematic flowchart of a process of a method for opening a wireless pipe capability according to another embodiment of the present invention. In FIG. 9j, it is assumed that a capability openness object is a UE, and a user of the UE needs to lease a wireless network resource, for example, a calculation, storage, or transmission resource, so as to deploy a third-party application program. Such resource configuration belongs to system level configuration. Herein, a wireless pipe network element may be an RNC.

901j. The UE sends a first control message to a COGW through a portal interface (Portal) provided by the COGW, where the first control message is used for requesting configuration on a virtual hardware resource.

For example, the first control message may carry a resource application template and the third-party application program, where the resource application template may be in a form of a table and is used for indicating information about demand of the UE for the virtual hardware resource.

902j. After receiving the first control message, the COGW allocates a virtual hardware resource to the third-party application program according to a virtual hardware resource state in a current network and information indicated by the resource application template.

903j. The COGW sends a second control message to an RNC corresponding to the allocated virtual hardware resource, where the second control message is used for instructing to configure the virtual hardware resource.

For example, the second control message may carry indication information and the third-party application program, where the indication information may be used for indicating the virtual hardware resource allocated to the third-party application program by the COGW.

904j. After receiving the second control message, the RNC configures the virtual hardware resource according to the second control message, and loads and operates the third-party application program.

905j. After completing the configuration, the RNC sends a second response message to the COGW, where the second response message is used for indicating that the resource configuration is completed.

906j. After receiving the second response message, the COGW sends a first response message to the UE through the portal interface (Portal) of the COGW, where the first response message is used for indicating that the resource configuration is completed.

The embodiment of the present invention enables a user to implement configuration on a virtual hardware resource by using, through a portal interface provided by a COGW, a capability of controlling a wireless pipe network element, so that the user experience can be improved.

As can be seen from the examples in FIG. 9a to FIG. 9j, in the embodiment of the present invention, a COGW converges a capability of at least one wireless pipe network element through a second interface, and supplies the capability of the at least one wireless pipe network element to a capability openness object through a first interface, so that the capability openness object can use the capability of the at least one wireless pipe network element, thereby implementing openness of a wireless pipe capability.

In addition, in the embodiment of the present invention, the COGW supplies the capability of the at least one wireless pipe network element to the capability openness object through the first interface, so that the capability openness object can use the capability of the at least one wireless pipe network element; therefore, the capability openness object can improve quality of service based on the opened wireless pipe capability, and can also bring diversified experience to a user.

In addition, in the embodiment of the present invention, the COGW converges the capability of the at least one wireless pipe network element through the second interface, so that multi-layered and diversified openness and operation of the wireless pipe capability can be implemented.

Figure 10:
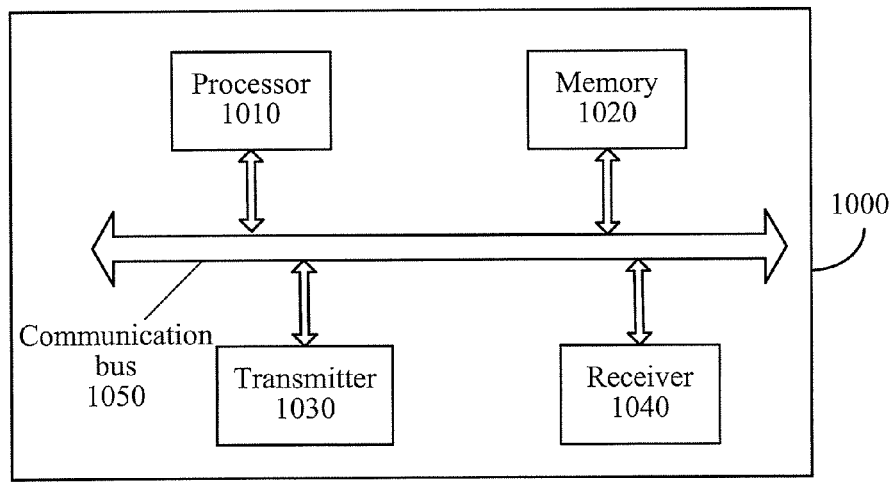
FIG. 10 is a schematic block diagram of a COGW according to an embodiment of the present invention.

FIG. 10 is a schematic block diagram of a COGW according to an embodiment of the present invention.

The COGW 1000 in FIG. 10 includes a processor 1010, a memory 1020, a transmitter 1030, and a receiver 1040. The processor 1010, the memory 1020, the transmitter 1030, and the receiver 1040 may perform communication through a communication bus 1050.

The transmitter 1030 and the receiver 1040 may interact with a capability openness object through a first interface, and interact with at least one wireless pipe network element through a second interface. The first interface and the second interface may be interfaces independent from each other. Each interface may also include multiple input and output ports.

The memory 1020 may include a high-speed RAM memory, or may further include a non-volatile memory (non-volatile memory), for example, at least one disk memory. The memory 1020 may store executable program code. The processor 1010 may invoke the executable program code stored in the memory 1020 to perform the method for opening a wireless pipe capability shown in FIG. 5.

The processor 1010 converges a capability of the at least one wireless pipe network element through the second interface, and the processor 1010 supplies the capability of the at least one wireless pipe network element to the capability openness object through the first interface, so that the capability openness object uses the capability of the at least one wireless pipe network element.

Optionally, as an embodiment, the capability of the at least one wireless pipe network element may include at least one of the following: a service flow level capability, a user level capability, a cell level capability, a base station level capability, and a system level capability.

Optionally, as another embodiment, the capability of the at least one wireless pipe network element may include a capability of providing atomic wireless pipe information. The processor 1010 may obtain, by using the receiver 1040, the atomic wireless pipe information from the at least one wireless pipe network element through the second interface. The processor 1010 may process the atomic wireless pipe information to obtain wireless pipe information, and send, by using the transmitter 1030, the wireless pipe information to the capability openness object through the first interface, where the wireless pipe information indicates a wireless pipe state.

Optionally, as another embodiment, the processor 1010 may perform anonymization processing on user information in the atomic wireless pipe information to obtain the wireless pipe information.

Optionally, as another embodiment, before the transmitter 1030 sends the wireless pipe information to the capability openness object through the first interface, the receiver 1040 may further receive a first capability query message from the capability openness object through the first interface, where the first capability query message is used for requesting the wireless pipe information. The transmitter 1030 may further send a second capability query message to the at least one wireless pipe network element through the second interface according to the first capability query message, where the second capability query message is used for requesting the atomic wireless pipe information. The receiver 1040 may receive, through the second interface, the atomic wireless pipe information sent, according to the second capability query message, by the at least one wireless pipe network element.

Optionally, as another embodiment, before the transmitter 1030 sends the wireless pipe information to the capability openness object through the first interface, the receiver 1040 may further receive a first capability subscription message from the capability openness object through the first interface, where the first capability subscription message is used for instructing to report the wireless pipe information within a subscription time. The transmitter 1030 may further send a second capability subscription message to the at least one wireless pipe network element through the second interface according to the first capability subscription message, where the second capability subscription message is used for instructing the at least one wireless pipe network element to report the atomic wireless pipe information within the subscription time. The receiver 1040 may receive, through the second interface, the atomic wireless pipe information that is sent by the at least one wireless pipe network element within the subscription time.

Optionally, as another embodiment, the receiver 1040 may further receive a first capability unsubscription message from the capability openness object through the first interface, where the first capability unsubscription message is used for instructing to stop reporting the wireless pipe information. The transmitter 1030 may further send a second capability unsubscription message to the at least one wireless pipe network element through the second interface according to the first capability unsubscription message, where the second capability unsubscription message is used for instructing the at least one wireless pipe network element to stop reporting the atomic wireless pipe information.

Optionally, as another embodiment, the capability of the at least one wireless pipe network element includes a capability of configuring a wireless network. The receiver 1040 may receive a first control message from the capability openness object through the first interface, where the first control message is used for instructing the COGW to configure the wireless network. The processor 1010 may control, through the second interface according to the first control message, the at least one wireless pipe network element to configure the wireless network.

Optionally, as another embodiment, the processor 1010 may send, by using the transmitter 1030, a second control message to the at least one wireless pipe network element through the second interface according to the first control message, where the second control message is used for instructing to configure the wireless network.

Optionally, as another embodiment, before the processor 1010 supplies the capability of the at least one wireless pipe network element to the capability openness object through the first interface, the receiver 1040 may further receive an authentication and authorization request message from the capability openness object through the first interface, where the authentication and authorization request message is used for requesting authentication on an identity of the capability openness object. The transmitter 1030 may further send an authentication and authorization response message to the capability openness object through the first interface, where the authentication and authorization response message is used for indicating that the authentication on the identity of the capability openness object succeeds.

Optionally, as another embodiment, the receiver 1040 may further receive an openable capability query message from the capability openness unit through the first interface, where the openable capability query message is used for requesting an openable capability list, and the openable capability list includes a capability of a wireless pipe network element that can be supplied to the capability openness object. The transmitter 1030 may further send an openable capability response message to the capability openness object through the first interface, where the openable capability response message includes the openable capability list.

Optionally, as another embodiment, the receiver 1040 may further receive a capability adding request message from the capability openness object through the first interface, where the capability adding request message is used for requesting the COGW to add the capability of the at least one wireless pipe network element into the openable capability list, and the openable capability list includes the capability of the wireless pipe network element that can be supplied to the capability openness object. The transmitter 1030 may further send a capability adding response message to the capability openness object through the first interface, where the capability adding response message is used for indicating that the capability of the at least one wireless pipe network element is successfully added into the openable capability list.

In the embodiment of the present invention, a COGW converges a capability of at least one wireless pipe network element through a second interface, and supplies the capability of the at least one wireless pipe network element to a capability openness object through a first interface, so that the capability openness object can use the capability of the at least one wireless pipe network element, thereby implementing openness of a wireless pipe capability.

In addition, in the embodiment of the present invention, the COGW supplies the capability of the at least one wireless pipe network element to the capability openness object through the first interface, so that the capability openness object can use the capability of the at least one wireless pipe network element; therefore, the capability openness object can improve quality of service based on the opened wireless pipe capability, and can also bring diversified experience to a user.

In addition, in the embodiment of the present invention, the COGW converges the capability of the at least one wireless pipe network element through the second interface, so that multi-layered and diversified openness and operation of the wireless pipe capability can be implemented.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, which are not described herein again.

In the several embodiments provided in the present application, it should be understood that, the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. A part or all of the units may be selected according to actual needs to achieve the objectives of the solutions of the embodiments.

In addition, functional units in the embodiments of the present invention may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The computer software product is stored in a storage medium, and includes several instructions for instructing a computer device (which may be a personal computer, a server, a network device, or the like) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A communications system, comprising:
 a capability openness object, a capability openness gateway (COGW), and at least one wireless pipe network element;
 a first interface provided between the COGW and the capability openness object, and a second interface provided between the COGW and the at least one wireless pipe network element;
 wherein the COGW is configured to converge a capability of the at least one wireless pipe network element through the second interface, and supply the capability of the at least one wireless pipe network element to the capability openness object through the first interface; and
 wherein the capability openness object is configured to use the capability of the at least one wireless pipe network element.

2. The system according to claim 1, wherein:
 each of the at least one wireless pipe network element comprises a COGW agent module; and
 the second interface is provided between the COGW and the COGW agent module.

3. The system according to claim 1, wherein the capability of the at least one wireless pipe network element comprises at least one of the following:
 a service flow level capability, a user level capability, a cell level capability, a base station level capability, and a system level capability.

4. The system according to claim 1, wherein:
 the capability of the at least one wireless pipe network element comprises a capability of providing atomic wireless pipe information;
 the COGW is configured to obtain the atomic wireless pipe information from the at least one wireless pipe network element through the second interface, and process the atomic wireless pipe information to obtain wireless pipe information, wherein the wireless pipe information indicates a wireless pipe state; and
 the capability openness object is configured to obtain the wireless pipe information from the COGW through the first interface.

5. The system according to claim 4, wherein:
 the capability openness object is further configured to:
  before obtaining the wireless pipe information from the COGW through the first interface, send a first capability query message to the COGW through the first interface, wherein the first capability query message is used for requesting the wireless pipe information;
 the COGW is configured to send a second capability query message to the at least one wireless pipe network element through the second interface according to the first capability query message, wherein the second capability query message is used for requesting the atomic wireless pipe information; and the at least one wireless pipe network element is configured to send the atomic wireless pipe information to the COGW through the second interface according to the second capability query message.

6. The system according to claim 4, wherein:
the capability openness object is further configured to:
before obtaining the wireless pipe information from the COGW through the first interface, send a first capability subscription message to the COGW through the first interface, wherein the first capability subscription message is used for instructing the COGW to report the wireless pipe information within a subscription time;
the COGW is further configured to send a second capability subscription message to the at least one wireless pipe network element through the second interface according to the first capability subscription message, wherein the second capability subscription message is used for instructing the at least one wireless pipe network element to report the atomic wireless pipe information within the subscription time; and
the at least one wireless pipe network element is configured to send the atomic wireless pipe information to the COGW through the second interface within the subscription time.

7. The system according to claim 1, wherein:
the capability of the at least one wireless pipe network element comprises a capability of configuring a wireless network;
the capability openness object is configured to send a first control message to the COGW through the first interface, wherein the first control message is used for instructing the COGW to configure the wireless network; and
the COGW is configured to control, through the second interface according to the first control message, the at least one wireless pipe network element to configure the wireless network.

8. The system according to claim 1, wherein:
the COGW comprises a first group of sub-COGWs and a second group of sub-COGWs;
the first interface is provided between the first group of sub-COGWs and the capability openness object, the first group of sub-COGWs is connected to the second group of sub-COGWs, the first group of sub-COGWs comprises one sub-COGW, and the second group of sub-COGWs comprise n sub-COGWs; and
the n sub-COGWs are in a one-to-one correspondence with n groups of wireless pipe network elements, the second interface is provided between each sub-COGWs and its corresponding group of wireless pipe network elements, and the n groups of wireless pipe network elements are obtained by grouping the at least one wireless pipe network element, wherein n is a positive integer.

9. The system according to claim 1 wherein the capability openness object comprises at least one of the following: an application function (AF) device and a user equipment.

10. A method for opening a wireless pipe capability, the method comprising:
converging, by a capability openness gateway (COGW), a capability of at least one wireless pipe network element through a second interface, wherein the second interface is an interface between the COGW and the at least one wireless pipe network element; and
supplying, by the COGW, the capability of the at least one wireless pipe network element to a capability openness object through a first interface, for the capability openness object using the capability of the at least one wireless pipe network element, wherein the first interface is an interface between the COGW and the capability openness object.

11. The method according to claim 10, wherein the capability of the at least one wireless pipe network element comprises at least one of the following:
a service flow level capability, a user level capability, a cell level capability, a base station level capability, and a system level capability.

12. The method according to claim 10, wherein:
the capability of the at least one wireless pipe network element comprises a capability of providing atomic wireless pipe information;
converging, by the COGW, the capability of the at least one wireless pipe network element through the second interface comprises:
obtaining, by the COGW, the atomic wireless pipe information from the at least one wireless pipe network element through the second interface; and
supplying, by the COGW, the capability of the at least one wireless pipe network element to the capability openness object through the first interface comprises:
processing, by the COGW, the atomic wireless pipe information to obtain wireless pipe information, and
sending, by the COGW, the wireless pipe information to the capability openness object through the first interface, wherein the wireless pipe information indicates a wireless pipe state.

13. The method according to claim 12, wherein:
before sending, by the COGW, the wireless pipe information to the capability openness object through the first interface, the method further comprises:
receiving, by the COGW, a first capability query message from the capability openness object through the first interface, wherein the first capability query message is used for requesting the wireless pipe information, and
sending, by the COGW, a second capability query message to the at least one wireless pipe network element through the second interface according to the first capability query message, wherein the second capability query message is used for requesting the atomic wireless pipe information; and
obtaining, by the COGW, the atomic wireless pipe information from the at least one wireless pipe network element through the second interface comprises:
receiving, by the COGW through the second interface, the atomic wireless pipe information sent, according to the second capability query message, by the at least one wireless pipe network element.

14. The method according to claim 12, wherein:
before sending, by the COGW, the wireless pipe information to the capability openness object through the first interface, the method further comprises:
receiving, by the COGW, a first capability subscription message from the capability openness object through the first interface, wherein the first capability subscription message is used for instructing to report the wireless pipe information within a subscription time, and
sending, by the COGW, a second capability subscription message to the at least one wireless pipe network element through the second interface according to the first capability subscription message, wherein the second capability subscription message is used for instructing the at least one wireless pipe network element to report the atomic wireless pipe information within the subscription time; and obtaining, by the COGW, the atomic wireless pipe information from the at least one wireless pipe network element through the second interface comprises:
receiving, by the COGW through the second interface, the atomic wireless pipe information that is sent by the at least one wireless pipe network element within the subscription time.

15. The method according to claim 10, wherein:
the capability of the at least one wireless pipe network element comprises a capability of configuring a wireless network; and
supplying, by the COGW, the capability of the at least one wireless pipe network element to the capability openness object through the first interface comprises:
receiving, by the COGW, a first control message from the capability openness object through the first interface, wherein the first control message is used for instructing the COGW to configure the wireless network, and
controlling, by the COGW, through the second interface according to the first control message, the at least one wireless pipe network element to configure the wireless network.

16. In a capability openness gateway (COGW), a computer program product stored on a computer readable medium comprising computer executable instructions that when executed implement the following:
converging a capability of at least one wireless pipe network element through a second interface, wherein the second interface is an interface between the COGW and the at least one wireless pipe network element; and
supplying the capability of the at least one wireless pipe network element to a capability openness object through a first interface, for the capability openness object using the capability of the at least one wireless pipe network element, wherein the first interface is an interface between the COGW and the capability openness object.

17. The computer program product according to claim 16, wherein the capability of the at least one wireless pipe network element comprises at least one of the following:
a service flow level capability, a user level capability, a cell level capability, a base station level capability, and a system level capability.

18. The computer program product according to claim 16, wherein:
the capability of the at least one wireless pipe network element comprises a capability of providing atomic wireless pipe information;
converging a capability of the at least one wireless pipe network element through the second interface comprises:
obtaining the atomic wireless pipe information from the at least one wireless pipe network element through the second interface; and
supplying the capability of the at least one wireless pipe network element to the capability openness object through the first interface comprises:
processing the atomic wireless pipe information to obtain wireless pipe information, and
sending the wireless pipe information to the capability openness object through the first interface, wherein the wireless pipe information indicates a wireless pipe state.

19. The computer program product according to claim 18, wherein:
before sending the wireless pipe information to the capability openness object through the first interface, the computer executable instructions further implement the following:
receiving a first capability query message from the capability openness object through the first interface, wherein the first capability query message is used for requesting the wireless pipe information, and
sending a second capability query message to the at least one wireless pipe network element through the second interface according to the first capability query message, wherein the second capability query message is used for requesting the atomic wireless pipe information; and
obtaining the atomic wireless pipe information from the at least one wireless pipe network element through the second interface comprises:
receiving through the second interface, the atomic wireless pipe information sent, according to the second capability query message, by the at least one wireless pipe network element.

20. The computer program product according to claim 18, wherein:
before sending, by the COGW, the wireless pipe information to the capability openness object through the first interface, the computer executable instructions further implement the following:
receiving a first capability subscription message from the capability openness object through the first interface, wherein the first capability subscription message is used for instructing to report the wireless pipe information within a subscription time, and
sending a second capability subscription message to the at least one wireless pipe network element through the second interface according to the first capability subscription message, wherein the second capability subscription message is used for instructing the at least one wireless pipe network element to report the atomic wireless pipe information within the subscription time; and
obtaining the atomic wireless pipe information from the at least one wireless pipe network element through the second interface comprises:
receiving through the second interface, the atomic wireless pipe information that is sent by the at least one wireless pipe network element within the subscription time.

* * * * *